United States Patent [19]

Mizoguchi et al.

[11] Patent Number: 4,937,674
[45] Date of Patent: Jun. 26, 1990

[54] SOLID-STATE IMAGING DEVICE WITH STATIC INDUCTION TRANSISTOR MATRIX

[75] Inventors: Toyokazu Mizoguchi; Junichi Nakamura, both of Ina, Japan

[73] Assignee: Olympus Optical Co., Ltd., Tokyo, Japan

[21] Appl. No.: 270,337

[22] Filed: Nov. 14, 1988

[30] Foreign Application Priority Data

Nov. 20, 1987 [JP] Japan .................. 62-293284

[51] Int. Cl.$^5$ ................................ H04N 3/14
[52] U.S. Cl. .......................... 358/213.12; 358/213.15
[58] Field of Search ............... 358/213.12, 213.15, 358/213.16, 213.17, 213.18, 212

[56] References Cited

U.S. PATENT DOCUMENTS

| | | | |
|---|---|---|---|
| 4,300,163 | 11/1981 | Wada et al. | 358/213.15 |
| 4,518,863 | 5/1985 | Fukuoka et al. | 358/213.15 |
| 4,593,320 | 6/1986 | Nishizawa et al. | 358/213.12 |
| 4,636,865 | 1/1987 | Imai | 358/213.12 |

Primary Examiner—Stephen Brinich
Attorney, Agent, or Firm—Armstrong, Nikaido, Marmelstein, Kubovcik & Murray

[57] ABSTRACT

A solid-state imaging device composed of static induction transistors arranged in a matrix-like manner between a plurality of row lines and a plurality of vertical signal lines, drive means for simultaneously reading out during a predetermined readout period the signals stored in the static induction transistors, in accordance with row selection signals to be applied to the row lines, and holding them in drive transistors, and successively reading out the signals thus held within the horizontal scanning period, and means for preventing spurious signals from being generated by the ON operation of those static induction transistors to which the row selection signals are not applied. This construction effectively prevents blooming generation due to the superimposition of signals from non-selected static induction transistors.

11 Claims, 22 Drawing Sheets

FIG. IA
PRIOR ART
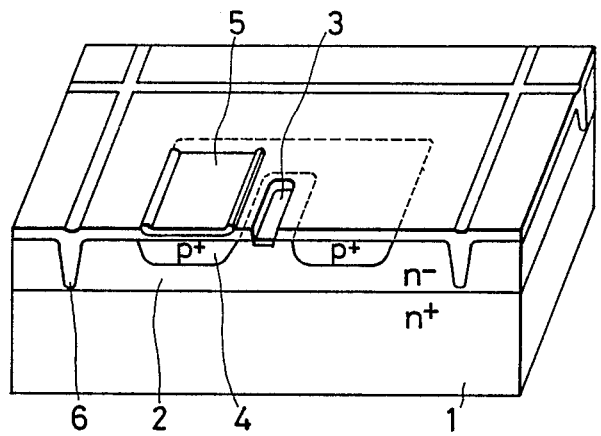
FIG. IB
PRIOR ART
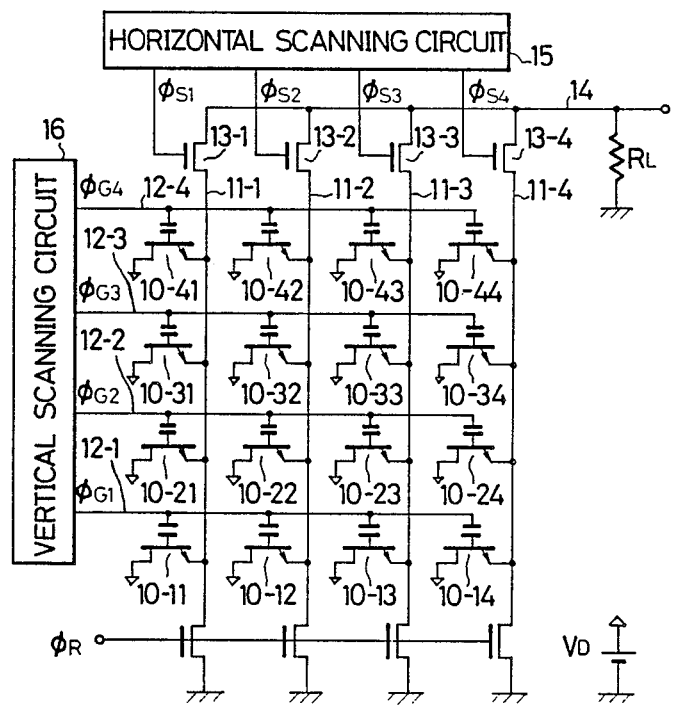

FIG.11
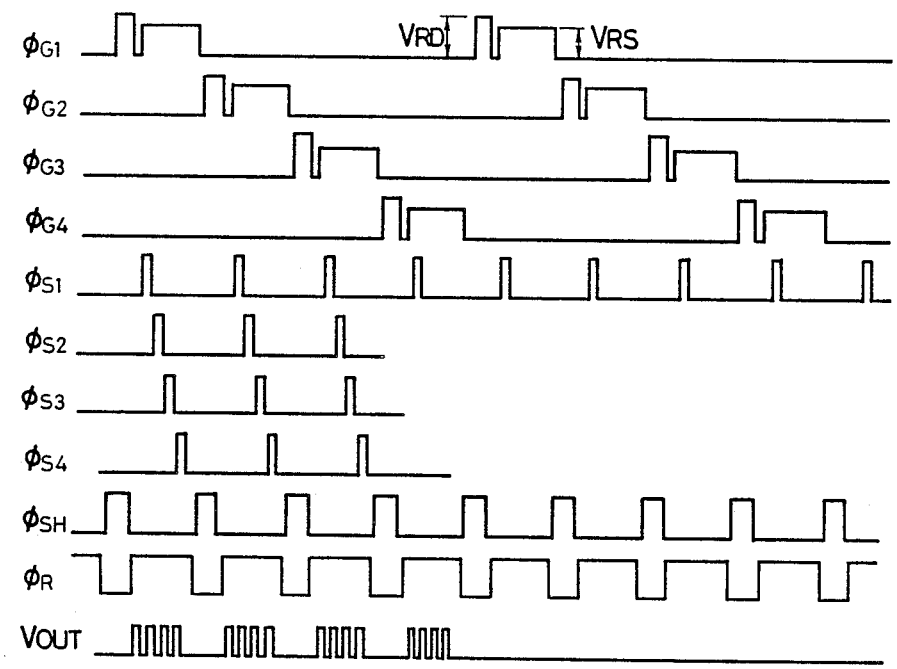
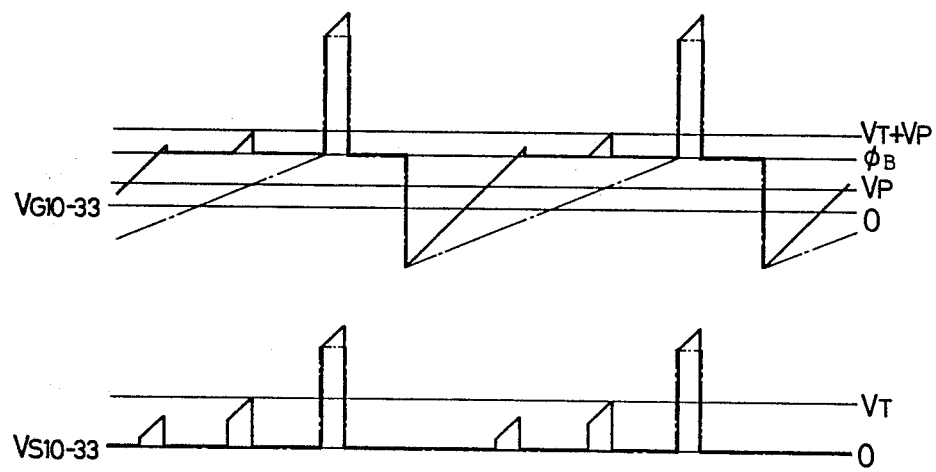

SOLID-STATE IMAGING DEVICE WITH STATIC INDUCTION TRANSISTOR MATRIX

BACKGROUND OF THE INVENTION

This invention relates to a solid-state imaging device which utilizes static induction transistors (hereinafter referred to as SIT) and which generates no spurious signals even when the incident quantity of light is saturated or almost saturated.

Conventional solid-state imaging devices generally utilize MOS transistors or charge coupled devices such as CCDs or BBDs. Solid-state imaging devices utilizing MOS transistors can only generate faint output signals. Besides, they exhibit an inadequate S/N ratio and a poor photosensitivity. Those utilizing CCDs, BBDs, etc. involve charge loss at the time of charge transfer, and are rather difficult to manufacture.

In view of these problems, solid-state imaging devices utilizing a static induction transistor for each pixel have been proposed, as disclosed, for example, in Japanese Patent Laid-Open No. 105672/1983. An example of such devices will be described with reference to FIGS. 1A and 1B.

FIG. 1A is a perspective view showing the structure of a pixel in a solid-state imaging device using SITs, and FIG. 1B is a circuit diagram of the solid-state imaging device.

Reference numeral 1 in FIG. 1A denotes an n+ silicon substrate which acts as the drain of the SIT. This substrate 1 is piled with an n− epitaxial layer 2 which serves as the channel area. A shallow n+ source area 3 is formed in this epitaxial layer 2, and is surrounded by a p+ gate area 4 provided in the epitaxial layer 2. Formed on the gate area 4 is an MOS capacitor 5, through which pulses are supplied.

When the gate area 4 is inversely biased, a depletion layer is formed outside this gate area 4. When hole-electron couples are generated by light impinging upon this depletion layer, the electrons are swept away to the source area 3 and the drain area 1, the holes being accumulated in the gate area 4. This causes the gate potential to be raised, resulting in the electric current between the drain and the source being modulated, whereby a signal amplified by the light is obtained. Reference numeral 6 in FIG. 1A denotes a separation area which serves to separate the pixels from each other.

Reference numerals 10-11, 10-12, ..... 10-21, 10-22, ....., ....., 10-44 in FIG. 1B denote SITs, each of which forms a pixel as is shown in FIG. 1A. In order to simplify the explanation, the SITs are shown here as arranged in four rows and four columns. The sources of the SITs belonging to the same longitudinal line are commonly connected to one of vertical signal lines 11-1, 11-2, ..... 11-4, which are connected to a video line 14 through respective switching MOSFETs 13-1, 13-2, ..... 13-4 composing the horizontal selection switches. The gates of the switching MOSFETs 13-1, ..... 13-4 are connected to a horizontal scanning circuit 15, and horizontal pulses $\phi_{S1}$, $\phi_{S2}$, .... $\phi_{S4}$ are applied to the gates of these MOSFETs.

The gates of the SITs belonging to the same lateral line, on the other hand, are commonly connected to one of row lines 12-1, 12-2, ..... 12-4. These row lines 12-1, 12-2, ..... 12-4 are connected to a vertical scanning circuit 16, vertical scanning pulses $\phi_{G1}$, $\phi_{G2}$, ..... $\phi_{G4}$ being applied to the gates of the SITs through the respective row lines mentioned above.

When one of the above-mentioned vertical scanning pulses is applied to a certain row line to select a pixel row and one of the above-mentioned horizotal scanning pulses is applied to a certain vertical signal line to select a pixel column, the optical signal current of the pixel at the intersection is read out. By thus successively outputting the horizontal and vertical scanning pulses, the pixels are successively scanned, whereby the signals for one picture are obtained.

FIG. 2 is a signal waveform diagram showing the timing of the pulses for operating the above-described solid-state imaging device. The vertical scanning pulses $\phi_G$ for selecting gates consist of pulses having two different high levels $V_{RD}$ and $V_{RS}$. During the horizontal scanning period $t_H$ of each row line, the pulses exhibit the read-out level $V_{RD}$, and during the subsequent horizontal blanking period $t_{BL}$, they exhibit the reset level $V_{RS}$. The horizontal scanning pulses $\phi_S$ for selecting sources reach the high level during each horizontal scanning period, thus successively scanning pixels arranged laterally. The resetting pulse $\phi_R$ reaches the high level during each horizontal blanking period $t_{BL}$, thus resetting pixels whose signals have been read out.

FIG. 3 shows the circuit construction of a pixel SIT $T_P$ including parasitic capacitance $C_{GD}$ between the gate and the drain, parasitic capacitance $C_{GS}$ between the gate and the source, floating capacitance $C_S$ of the source line, and ON resistance $R_{ON}$ of the switching MOSFET $T_S$ for horizontal selection. Reference character $T_R$ denotes the MOSFET for resetting.

FIG. 4 shows the temporal changes in the gate potential $V_G$ and the source potential $V_S$ of a pixel SIT when a horizontal scanning pulse $\phi_S$, a vertical scanning pulse $\phi_G$ and a resetting pulse $\phi_R$ are applied thereto. Reference character $\phi_B$ denotes the forward threshold voltage of a gate-source diode which will be described later.

The temporal changes in the gate potential $V_G$ and the source potential $V_S$ will be described with reference to FIGS. 2 to 4.

(1) At the time $t_1$:

$\phi_G = V_{RS}(>\phi_B)$. When the resetting pulse $\phi_R$ has reached the High level, the source potential $V_S$ is reset to the GND, so that $V_G = \phi_B$.

(2) At the time $t_2$:

When the pulses $\phi_G$ and $\phi_R$ are set to the GND, the gate potential $V_G$ is put in an inversely biased condition which is given by the following equation (1) and starts optical integration.

$$V_G(t_2) = -C_G/(C_G+C_J) \ V_{RS} + \phi_B \qquad (1)$$

where $C_J = C_{GS} + C_{GD}$ (3) At the time $t_3$:

During the optical integration time, the optical charge $Q_{Ph}$ generated by the irradiation of light is accumulated in the gate capacitance $(C_G + C_J)$.

The above $Q_{Ph}$ is given by the following equation (2):

$$Q_{Ph} = G_L \cdot A \cdot t_{int} \qquad (2)$$
$$= G_L \cdot A \cdot E$$

where $G_L$ = ratio of generation ($\mu$A/$\mu$W); A = light receiving area (cm$^2$); P = light irradiance ($\mu$W/cm$^2$); $t_{int}$ = integration time (S): and E = exposure (E = P·$t_{int}$). The gate potential $V_G$ is given by the following equation (3), which is obtained from the above equations (1) and (2).

$$V_G(t_3) = -C_G/(C_g+C_j)\cdot V_{RS} + \phi_B + Q_{PH}/(C_G+C_j) \quad (3)$$

(4) At the time $t_4$:

When $\phi_G = V_{RD}$, the gate potential $V_G$ becomes as follows:

$$\begin{aligned} V_G(t_4) &= V_G(t_3) + C_G/(C_G + C_j) \cdot V_{RD} \\ &= C_G/(C_G + C_j) \cdot (V_{RD} - V_{RS}) + \\ &\quad \phi_B + Q_{Ph}/(C_G + C_j) \end{aligned} \quad (4)$$

When $V_G(t_4) > V_P$, the drain current of the pixel SIT flows, charging the source line capacitance $C_S$. Here, $V_P$ denotes the potential difference between the gate and the source which causes the drain current of the pixel SIT to flow, and is called pinch-off voltage. This charging is continued until the potential difference $V_{GS}$ between the gate and the source becomes $V_P$. The source potential is consequently given by the following equation (5):

$$V_S(t_4) = C_G/(C_G+C_j)\cdot(V_{RD}-V_{RS}) + \phi_B + Q_{Ph}/(C_G+C_j) - V_P \quad (5)$$

Since $V_P < \phi_B$, almost no current flows from the p+ gate to the n+ source of the pixel SIT.

(5) At the time $t_5$:

The horizontal selection pulse $\phi_S$ reaches the High level, the source line being connected to the load resistor $R_L$ through the switching MOSFET $T_S$ (the ON resistance is $R_{ON}$). The output $V_{OUT}$ changes with time and is given by the following equation (6):

$$V_{OUT}(t) = R_L/(R_{ON}+R_L)\cdot V_S(t) \quad (6)$$

FIG. 5 shows the temporal changes of the gate potential $V_G$, the source potential $V_S$ and the output $V_{OUT}$ when the horizontal selection pulse $\phi_S$ has reached the High level. When in FIG. 5 the horizontal selection pulse $\phi_S$ has reached the High level, the p+ gate and the n+ source of the pixel SIT are put in the forward direction and pn diode current flows, the signal charge accumulated in the gate capacitance flowing out to the source. The optical signal charge in this solid-state imaging device is consequently destroyed, the gate potential $V_G$ and the source potential $V_S$ being both decreased. The value of the output $V_{OUT}$ given by the above equation (6) becomes smaller than the value when the above equation (5) is substituted into $V_S(t)$ in the equation (6).

FIG. 6 shows the circuit construction of another example of the solid-state imaging device proposed by the applicant in U.S. Pat. Appln. No. 07/66424. In this example, the sources of drive MOSFETs 18-1, 18-2, ... 18-4 are connected to the respective drains of switching MOSFETs 13-1, 13-2. ... 13-4 which constitute the horizontal selection switches. The gates of these drive MOSFETs are connected to the respective vertical signal lines 11-1, 11-2, ... 11-4. The drains are commonly connected to a power source $V_{DD}$ and a video line resetting MOSFET 19 is connected to a video line 14, parallel to a load resistor $R_L$. The rest of the circuit construction is the same as that shown in FIG. 1B.

In this solid-state imaging device, a video line resetting pulse $\phi_{RV}$ shown in FIG. 7 is applied to the gate of the resetting MOSFET 19 and the drive pulses shown in FIG. 2 are applied to the corresponding elements, whereby the device is operated in the same manner as the solid-state imaging device shown in FIG. 1B. Further, this solid-state imaging device is capable of taking out an output in proportion to its optical signal charge during each subsequent readout period, without destroying the optical signal charge accumulated in the gate capacitance of the pixel SITs.

Here, the output voltage $V_{OUT}$ when this solid-state imaging device is operated with the drive pulses shown in FIG. 2 is expressed by the following equation (7):

$$V_{OUT} = a\{V_S(t_4) - V_T\} \quad (7)$$

The reference character $V_T$ denotes the threshold voltage of the drive MOSFETs 18-1, 18-2, .... 18-4, and the reference character a denotes the voltage gain of the source follower formed by the drive MOSFETs 18-1, 18-2, .... 18-4, the switching MOSFETs 13-1, 13-2, .... 13-4 and the load resistor $R_L$. By substituting the above equation (5) into this equation (7), the following equation (8) is obtained:

$$V_{OUT} = a\{C_G/(C_G+C_j)\cdot(V_{RD}-V_{RS}) + \phi_B + Q_{Ph}/(C_G+C_j) - V_P - V_T\} \quad (8)$$

As will be appreciated from the above equation (7), no output appears in this solid-state imaging device until the source potential $V_S$ has become equal to or higher than the threshold voltage $V_T$. The values of the $V_{RD}$ and $V_{RS}$ in this solid-state imaging device are accordingly so set that $V_{OUT} \geq 0$ when the selected pixel is in the dark condition ($Q_{Ph} = 0$).

While the above-described imaging device is capable of effectively overcoming the problems in those solid-state imaging devices using MOS transistors, CCDs, BBDs or the like, various experiments conducted by the inventors of the present invention has revealed that it exhibits a poor blooming resistance. The term "blooming" will now be explained.

When intensive light in excess of the saturated quantity of light impinges upon a non-selected pixel SIT of the solid-state imaging device shown in FIG. 1B, causing the gate potential thereof to reach the pinch-off voltage $V_P$, this non-selected pixel SIT is turned ON and a channel current (drain/source current) flows, thereby raising the potential of the vertical signal line to which this SIT is connected. When in this condition another pixel SIT which is connected to the same vertical signal line is selected, the output of the above non-selected pixel SIT appears at the end of the load resistor $R_L$ together with the inherent output of that selected pixel SIT. As a result, a blooming in the form of white vertical stripes are observed on the TV monitor.

Here, consideration will be given to the quantity of light required for raising the gate potential of the non-selected pixel SIT up to the pinch-off voltage $V_P$. Suppose in FIG. 1B only the pixel SIT 10-33 is irradiated with light and the other pixel SITs are not irradiated with light, the quantity of light which causes the output to appear when the pixel SIT 10-23 is selected may be obtained as shown in FIG. 8. To simplify the description, it will be assumed here that non-interlace scanning is to be conducted. Since output saturation is generated through application of the resetting pulse $\phi_R$ to the horizontal blanking time $t_{BL}$ and clamping of the gate voltage $V_G$ by $\phi_B$, the rate of change $m_{sat}$ (the gradient of the virtual straight lines in FIG. 8) of the gate potential $V_G$ corresponding to the saturated light quantity can be expressed by the following equation (9):

$$m_{sat}=\{C_G \cdot V_{RS}/(C_G+C_J)\}/\{T_f-(t_H+t_{BL})\} \quad (9)$$

where $T_f$ denotes the field time.

When on the other hand the pixel SIT 10-23 is selected, the rate of change m,(the gradient of the full straight lines in FIG. 8) of the gate voltage $V_{G10\text{-}33}$ of the pixel SIT 10-33 corresponding to the quantity of light which causes the false output of the pixel SIT 10-33 to appear can be expressed by the following equation (10), supposing that the pixel SIT 10-33 is the third one in the column direction, and that the alias appears with a timing corresponding to the pixel readout timinig for the row line prior to that of the proper pixel concerned.

$$m'=\{C_G \cdot V_{RS}/(C_G+C_J)-\phi_B+V_P\}/\{T_f-(t_H+t_{BL})+3t_S\} \quad (10)$$

where $t_S$ denotes the period of the horizontal scanning pulse in the horizontal scanning circuit 15.

As will be appreciated from FIG. 8 and the equations (9), (10), $m_{sat} > m'$. This implies that the quantity of light which causes the alias to appear when the pixel SIT 10-23 is selected is smaller than the saturated quantity of light. Actually, a quantity of light several times larger than the saturated quantity of light will be necessary for the white vertical stripes to be observed on the TV monitor. At all events, it may be concluded that the device exhibits a very low blooming resistance.

Next, the blooming generation in the solid-state imaging device shown in FIG. 6 will be described. FIG. 9 depicts a situation in which, as in the above described case, the output of the pixel SIT 10-33 appears when the pixel SIT 10-23 is selected, with exclusively the pixel SIT 10-33 being irradiated with light. Here, the rate of change m" (the gradient of the full straight lines in FIG. 9) of the gate potential $V_{G10\text{-}33}$ corresponding to the quantity of light which causes the alias of the pixel SIT 10-33 to appear may be expressed, as in the above case, by the following equation (11):

$$m''=(V_T+V_P-\phi_B)/3t_S \quad (11)$$

In other words, this solid-state imaging device exhibits blooming resistance until the quantity of light reaches the value $m''/m_{sat}$ times larger than the saturated quantity of light. The reason for this result is that an additional quantity of light is required in order to raise the gate potential $V_{G10\text{-}33}$ by the amount corresponding to $V_T$, which is not the case with the solid-state imaging device shown in FIG. 1B. In a prototype device built by the inventor, $V_T=0.8$ (V), $V_P=0.3$ (V), $\phi=0.8$ (V), $C_G/(C_G+C_J)=0.6$, and $V_{RS}=3$ (V). The blooming reistance $m''/m_{sat}$ of this device is:

$$m''/m_{sat} = \frac{(0.8 + 0.3 - 0.8)/3 \times 17.6}{0.6 \times 3/(16600 - 63.6)}$$
$$= 60$$

This value corresponds to the requisite quantity of light for the the alias to appear at the right end of the TV monitor. Actually, a still larger quantity of light is necessary for the alias to be observed as white stripes. However, even this is not to be regared as a sufficient blooming resistance.

SUMMARY OF THE INVENTION

This invention has been conceived in view of the above problems. It is accordingly the object of this invenion to provide a solid-state imaging device which exhibits a very high blooming resistance.

In order to achieve this object, the present invention provides a solid-state imaging device comprising a plurality of SITs arranged in a matrix-like manner between a plurality of row lines and a plurality of vertical signal lines, the gate electrode of each SIT being connected to a row line and one principal electrode thereof to a vertical signal line, drive transistors connected to each of said plurality of vertical signal lines through repective sample transistors, drive means for reading out, simultaneously for each row line, the signals stored in said SITs, during a predetermined readout period, holding them in said drive transistors through said sampling transistors, and successively reading out, within the horizontal scanning period, the signals thus held, and clamping means capable of clamping the gate potentials of all the SITs at a predetermined potential which does not involve any generation of blooming during the periods other than said predetermined readout period.

In the above solid-state imaging device thus constructed, the clamping means serves to clamp, during the periods other than a predetermined readout period, the gate potential of any of the pixel SITs whose gate potential is in excess of a predetermined potential which does not involve any generation of blooming, at said predetermined potential. This effectively prevents generation of blooming due to superimposition of signals from non-selected pixel SITs.

BRIEF DESCRIPTION OF THE DRAWINGS

FIG. 1A is a structural drawing of a pixel composing a conventional solid-state imaging device;

FIG. 1B is a circuit diagram of the entire conventional solid-state imaging device;

FIG. 11 is a signal waveform chart for illustrating the operation of the first embodiment of this invention;

DETAILED DESCRIPTION OF THE INVENTION

Figure 10:
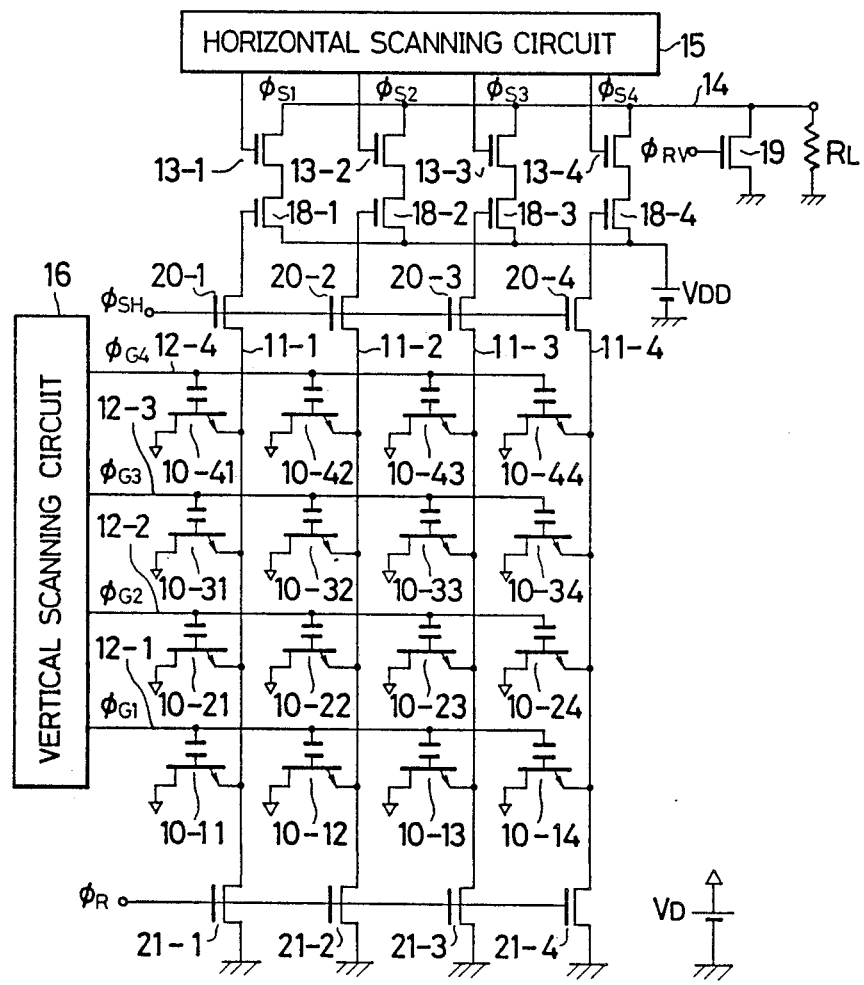
FIG. 10 is a circuit diagram showing the first embodiment of this invention.

FIG. 10 is a circuit diagram showing an embodiment of this invention. In order to simplify the explanation, this embodiment is shown as arrayed in four rows and four columns, the elements having the sam functions as those shown in FIGS. 1B and 6 being referred to by the same reference numerals. Pixels SIT 10-11, 10-12, . . . . 10-14, 10-21, 10-22, . . . . . 10-24, . . . . . 10-44, each having the same construction as that shown in FIG. 1A, are arranged in a matrix-like manner. The sources of the SITs belonging to the same longitudinal line are commonly connected to one of vertical signal lines 11-1, 11-2, . . . . . 11-4, and the gates of the SITs belonging to the same lateral line are commonly connected to one of row lines 12-1, 12-2, . . . . 12-4 through respective capacitors.

The vertical signal lines 11-1, 11-2, . . . . 11-4 are respectively connected to the gates of drive MOSFETs 18-1, 18-2, . . . . 18-4 through the drain/source paths of sample MOSFETs 20-1, 20-2, . . . 20-4, a sample holding pulse $\phi_{SH}$ being commonly applied to the gates of the sample MOSFETs 20-1, 20-2, . . . 20-4. The drains of the drive MOSFETs 18-1, 18-2, . . . 18-4 are commonly connected to a power source $V_{DD}$, and their sources are connected to a video line 14 through switching MOSFETs 13-1, 13-2, . . . . 13-4 constituting the horizontal selection switches. The gates of the switching MOSFETs 13-1, 13-2, . . . 13-4 are connected to a horizontal scanning circuit 15 so that horizontal scanning pulses $\phi_{S1}$, $\phi_{S2}$, . . . . $\phi_{S4}$ may be applied. A load resistor $R_L$ and a resetting MOSFET 19 are connected in parallel to the video line 14, a video line resetting pulse $\phi_{RV}$ being applied to the gate of the resetting MOSFET 19.

On the other hand, row lines 12-1, 12-2, . . . . 12-4 are connected to a vertical scanning circuit 16 for vertical scanning pulses $\phi_{G1}$, $\phi_{G2}$, . . . . $\phi_{G4}$ to be applied. Further, the ends of the vertical signal lines 11-1, 11-2, . . . 11-4 on the side opposite to the sample MOSFETs 20-1, 20-2, . . . . 20-4 are grounded through respective resetting MOSFETs 21-1, 21-2, . . . . 21-4, a common resetting pulse $\phi_R$ for the pixel SITs being applied to the gates of these resetting MOSFETs.

In this embodiment, these resetting MOSFETs 21-1, 21-2, . . . . 21-4 serve not only to reset the above pixel SITs, but also to clamp, as will be described later, the gate potential of any pixel SIT at a predetermined potential which does not involve any generation of blooming, when there are non-selected pixel SITs. The drains of the SITs 10-11, 10-12, . . . . . 10-44 constituting the picure elements are commonly connected to a drain power source $V_D$.

The operation of the solid-state imaging device shown in FIG. 10 will now be described with reference to the drive pulse timing chart shown in FIG. 11. When a vertical scanning pulse $\phi_{Gi} = V_{RS}$(i=1, 2, . . . , 4) and the resetting MOSFET is turned ON by the pixel resetting pulse $\phi_R$, the gate potentials of the pixel SITs are reset to $\phi_B$, and the source potentials thereof are reset to the GND. When the vertical scanning pulse $\phi_{Gi}$ and the resetting pulse $\phi_R$ are lowered to the Low level, the gates of the pixel SITs are put in an inversely biased condition and begin optical integration. When after a predetermined period for integration $\phi_{Gi}$ is raised to $V_{RD}$, the gates of the pixel SITs in the i-th row line are biased into the read-out condition. When in this condition the sample holding pulse $\phi_{SH}$ to be applied to the gates of the sample MOSFETs 20-1, 20-2, . . . . 20-4 is raised to the High level, the source potentials of the pixel SITs in the i-th row line are simultaneously transmitted to the gates of the drive MOSFETs 18-1, 18-2, . . . . 18-4 through the sample MOSFETs 20-1, 20-2, . . . . 20-4, and are held in the gate capacitance of the drive MOSFETs 18-1, 18-2, . . . . 18-4 even after the sample holding pulse $\phi_{SH}$ has been lowered to the Low level. After that, the vertical scanning pulses $\phi_{Gi}$ are lowered to the Low level.

$\phi_{Gi}$ may be raised to $V_{RD}$ after the sample holding pulse $\phi_{SH}$ has been raised to the High level. The resetting pulse $\phi_R$ is raised to the High level after the sample holding pulse $\phi_{SH}$ has been lowered to the Low level, and is lowered to the Low level immediately before the vertical scanning pulse $\phi_{Gi+1}$ of the next line reaches $V_{RD}$, the vertical scanning pulse $\phi_{Gi}$ reaching $V_{RS}$ with the same timing as the resetting pulse $\phi_R$ or during the High level period of the $\phi_R$.

Voltage signals $V'_{Sij}$ (i,j=1,2, . . . 4) which are held in the gate capacitance of the drive MOSFETs 18-1, . . . 18-4, are successively read out during the Low level period of the sample holding pulse $\phi_{SH}$ by turning on the switching MOSFETs 13-1, 13-2, . . . . 13-4 with the horizontal scanning pulses $\phi_{Sj}$ (j = 1, 2, . . . 4). Suppose the voltage gain of the source follower formed by the drive MOSFETs 18-1, 18-2, . . . . 18-4, the switching MOSFETs 13-1, 13-2, . . . . . 13-4 and the load resistor $R_L$ is a, the output voltage $V_{OUT}$ is given by the following equation (12):

$$V_{OUT} = a\, V'_{Sij} \quad (12)$$

Figure 2:
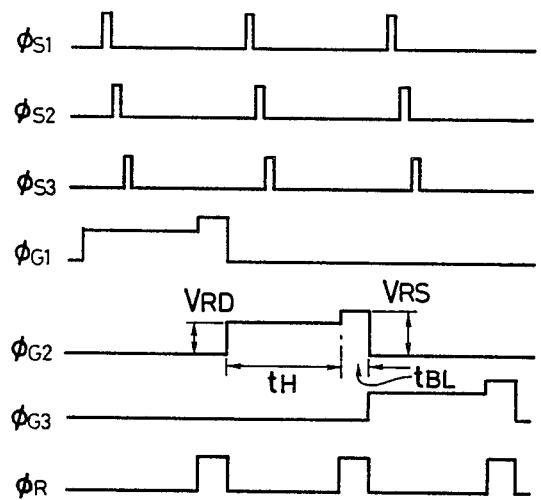
FIG. 2 is a signal waveform diagram illustrating the operation of the conventional solid-state imaging device.
Figure 3:
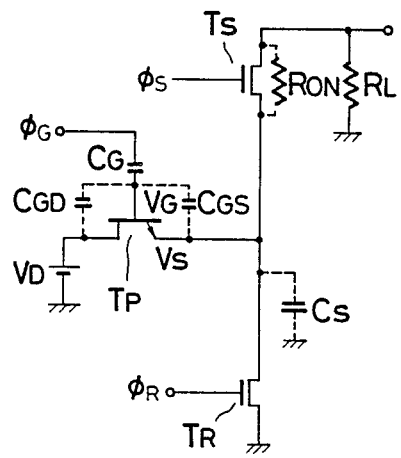
FIG. 3 is a circuit diagram focusing on one pixel composing the conventional solid-state imaging device.
Figure 4:
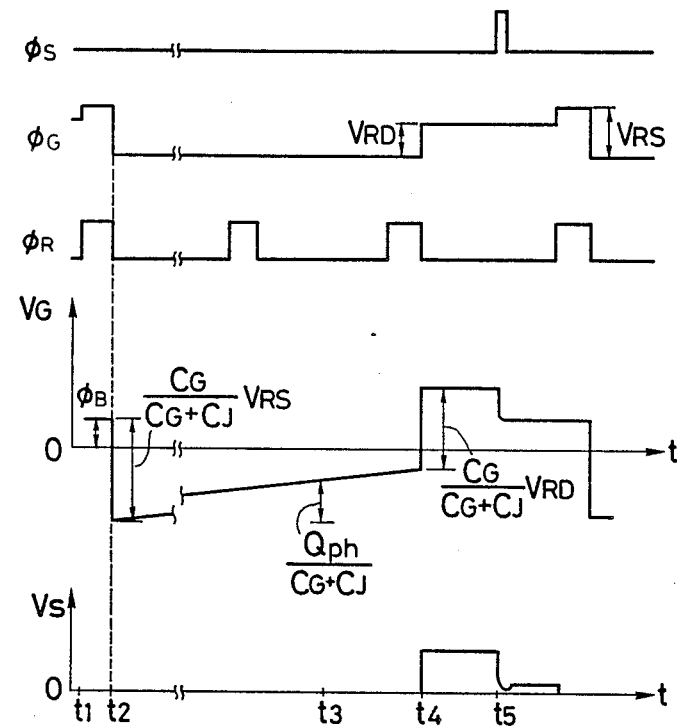
FIGS. 4 and 5 are signal waveform charts for illustrating the operation of the circuit shown in FIG. 3.
Figure 5:
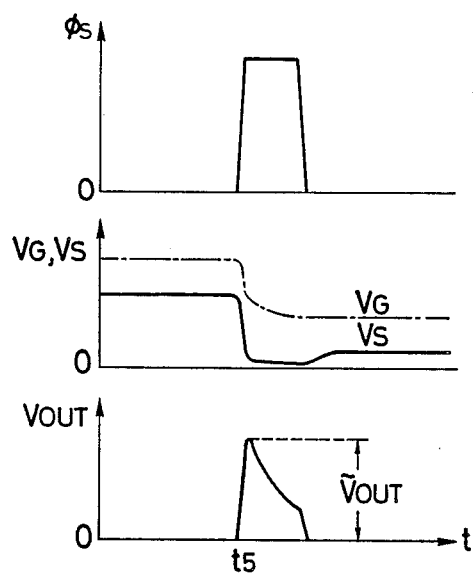
Figure 6:
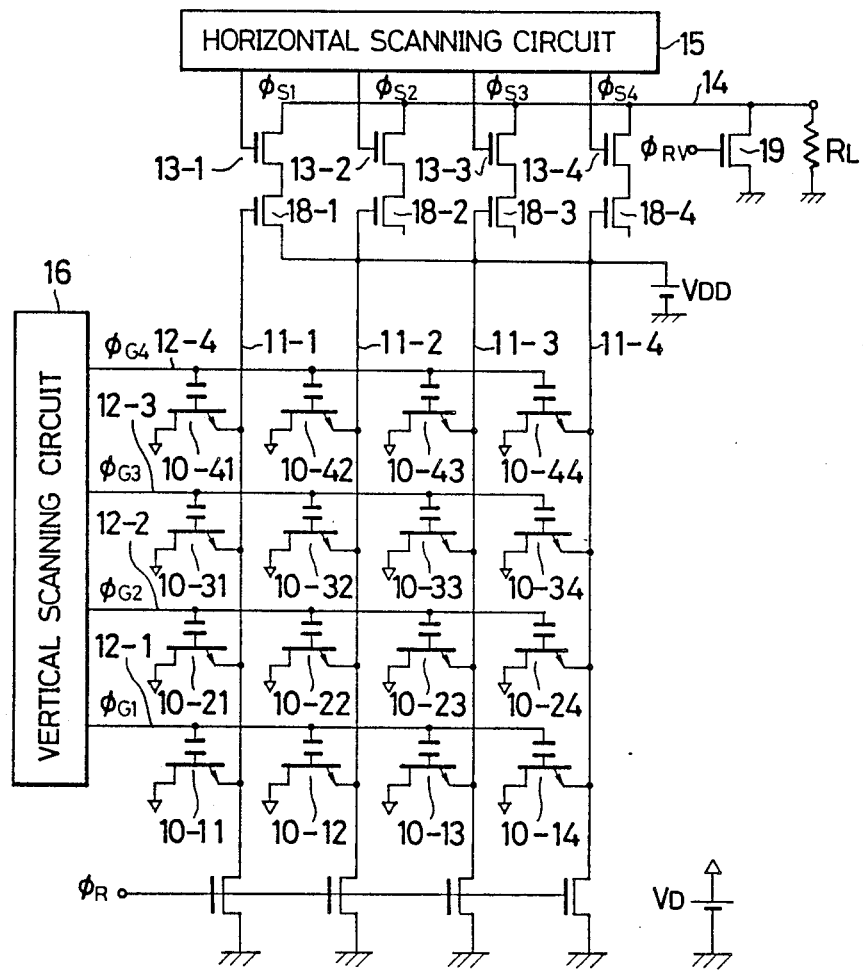
FIG. 6 is a structural drawing of another conventional solid-state imaging device.
Figure 7:
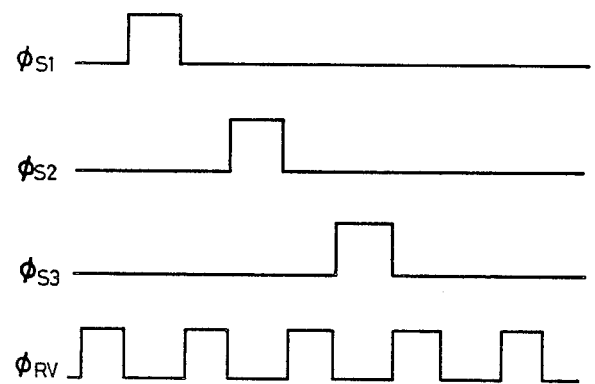
FIG. 7 is a signal waveform chart showing the essential parts of the waveform of the device shown in FIG. 6 so as to illustrate the operation thereof.
Figure 8:
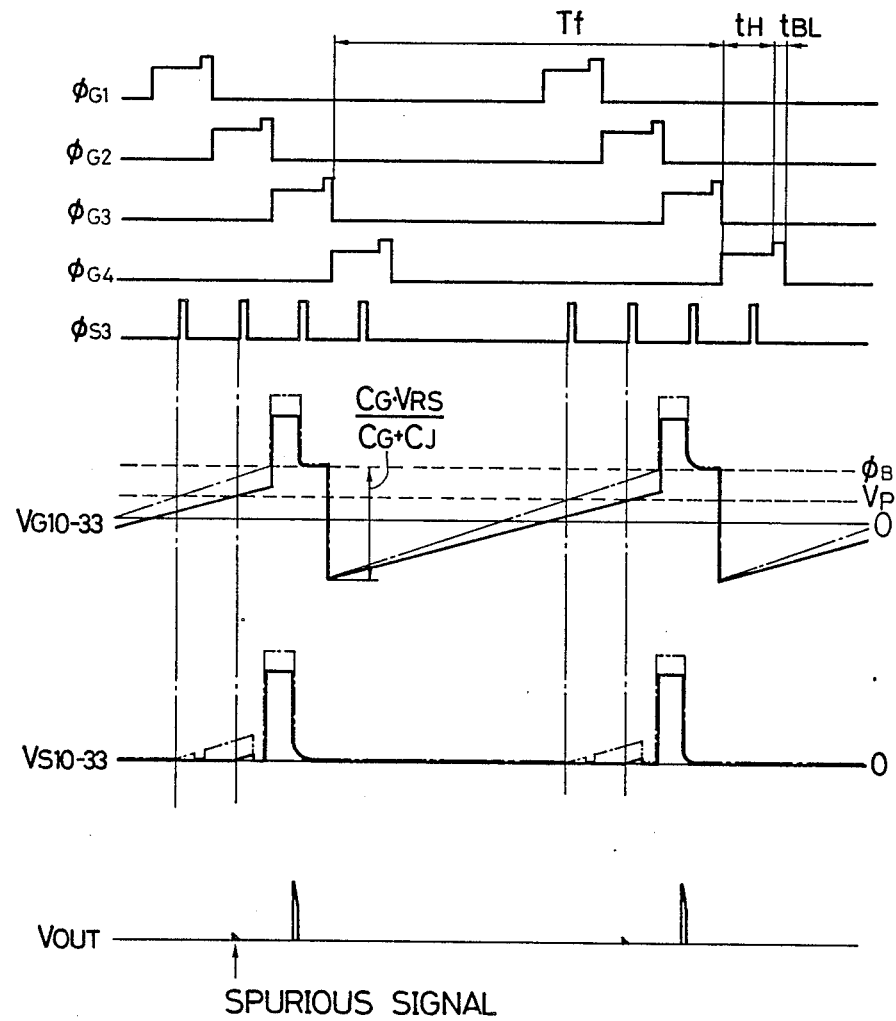
FIG. 8 is a signal waveform chart for illustrating the generation of blooming in the solid-state imaging device shown in FIG. 1B.
Figure 9:
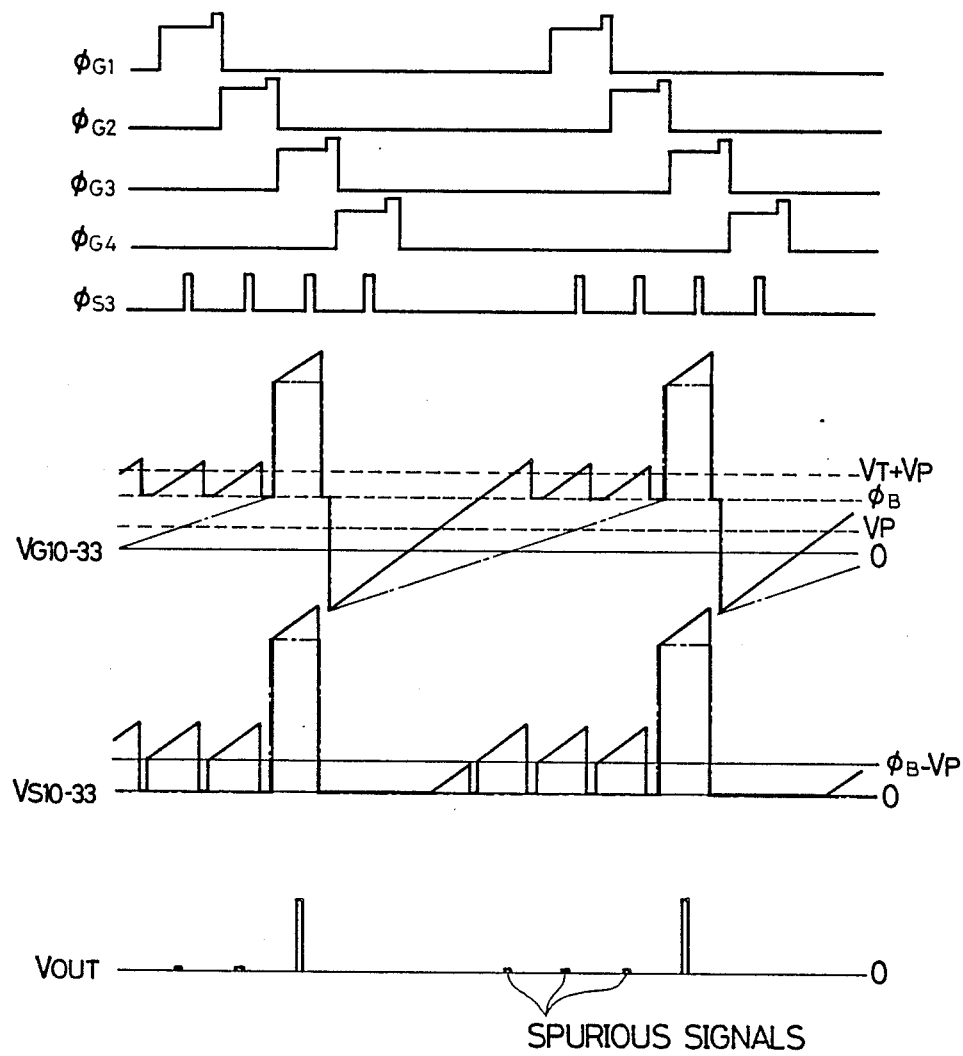
FIG. 9 is a signal waveform chart for illustrating the generation of blooming in the solid-state imaging device shown in FIG. 6.

As will be appreciated from the above description, the application timing for $V_{RS}$ and $V_{RD}$ in the pulses $\phi_G$ which are to be applied to the gates of the pixel SITs in this embodiment is a reverse of that in the prior art described with respect to FIGS. 1B and 6. In this embodiment, the period in which $\phi_G = V_{RS}$ and $\phi_R$ = High level constitutes the entire horizontal scanning period $t_H$ or a certain period in the last stage thereof, and the period in which $\phi_G = V_{RD}$ and $\phi_{SH}$ = High level is within the horizontal blanking period.

Next, the blooming in this embodiment will be described. It is to be assumed here, as in the above-described case, that exclusively the non-selected pixel SIT 10-33 is irradiated with light. The conditions of the gate potential $V_{G10-33}$ and the source potential $V_{S10-33}$ of the pixel SIT 10-33 in this case are shown in FIG. 11. As will be appreciated from FIG. 11, during the period in which $\phi_G = V_{RS}$ and $\phi_R$ = High level, the gate potential $V_{G10-33}$ is clamped at $\phi_B$ even when the non-selected pixel SIT 10-33 is irradiated with an intensive light which is in excess of the saturated quantity of light. It is exclusively during the $\phi_R$ Low level period in which the gates and sources are put in a floating condition that the gate potential $V_{G10-33}$ of this non-selected pixel SIT 10-33 is raised by the light irradiation, and it is until the termination of the sample holding effected by the High level of the sample holding pulse $\phi_{SH}$ that the raise of the source potential $V_{S10\text{-}33}$ of this pixel SIT can become a false readout signal.

Further, as in the prior art described with reference to FIG. 6, the output of this embodiment only appears when the source potential $V_{S10\text{-}33}$ has become equal to or higher than the threshold voltage VT of the drive MOSFETs 18-1, 18-2, . . . . 18-4, i.e., when the gate potential $V_{G10\text{-}33}$ has become $(V_P+V_T)$ or higher.

From the above, the rate of change m''' (the gradient of the full straight lines in FIG. 11) of the gate potential $V_{G10\text{-}33}$ corresponding to the quantity of light which causes blooming to be generated can be obtained from the following equation (13), supposing the period in which the resetting pulse $\phi_R$ is at the High level is $t_H$ and the time which it takes the sample holding pulse $\phi_{SH}$ to reach the Low level after the resetting pulse $\phi_R$ has been lowered to the Low level is $t_{BL}/n$:

$$m''' = (V_P + V_T - \phi_B)/t_{BL} \cdot n \quad (13)$$

On the other hand, the rate of change $m_{sat}$ (the gradient of the virtual straight lines in FIG. 11) of the gate potential $V_{G10\text{-}33}$ is given by the above equation (9). Accordingly, the quantity of light which causes blooming to be generated is $m'''/m_{sat}$ times larger than the saturated quantity of light. Suppose, as in FIG. 6, $V_T=0.8$ (V), $V_P=0.3$ (V), $\phi=0.8$ (V), $C_G/(C_G+C_J)=0.6$, and $V_{RS}=3$ (V), $$m'''/m_{sat} = \frac{(0.8 + 0.3 - 0.8)n/10.8}{0.6 \times 3/(16600 - 63.5)}$$
$$= 300 \cdot n.$$

At all events, this embodiment exhibits a blooming resistance ca. 400 times higher than that shown in FIG. 1B, and ca. 5 times as high as that shown in FIG. 6 or more. Accordingly, it promises a high picture quality.

Further, since this embodiment involves no difference in integration time due to difference in horizontal scanning times, the integration time is the same for all the pixels. In addition, since the point in time for integration also is the same for picuture elements belonging to the same row line, the device may be considered to possess the function of a focal plane shutter. In other words, the timing with which the vertical scanning pulse $\phi_G$ is raised to the resetting voltage $V_{RS}$ can be set at an arbitrary horizontal scanning period within 1-field time $T_f$, which makes it possible to arbitrarily set the optical charge integration time within the span ranging from the horizontal blanking time $t_{BL}$ to the 1-field time $T_f$, using the time $(t_H+t_{BL})$ as the unit (shutter function). Further, by setting the vertical scanning pulse $\phi_G$ to 0 (V) when the reset pulse $\phi_R$ is at the High level, it is made possible to perform non-destructive readout, which promises the possibility of its new applications in such fields as image processing and instrumentation.

Figure 12A:
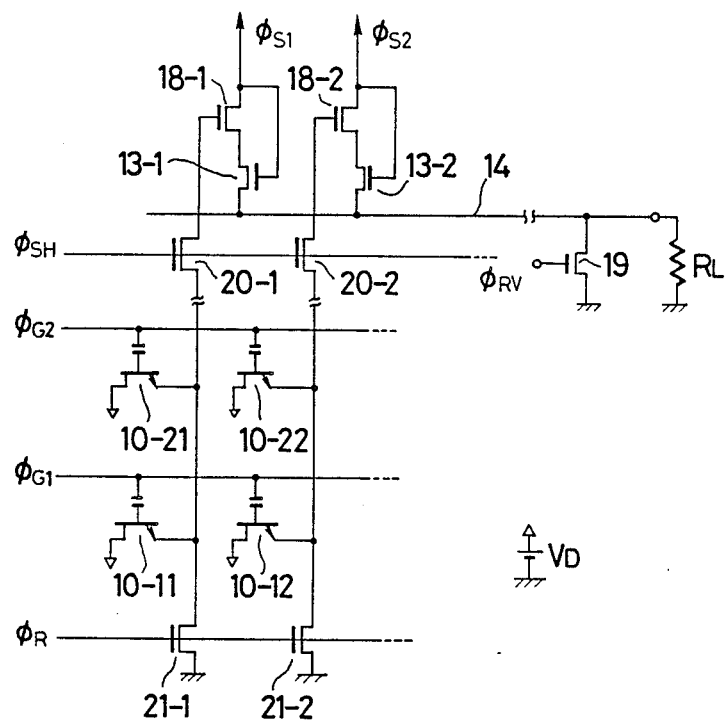
FIGS. 12A, 12B and 12C are circuit diagrams showing the essential parts of variations of the first embodiment of this invention.
Figure 12B:
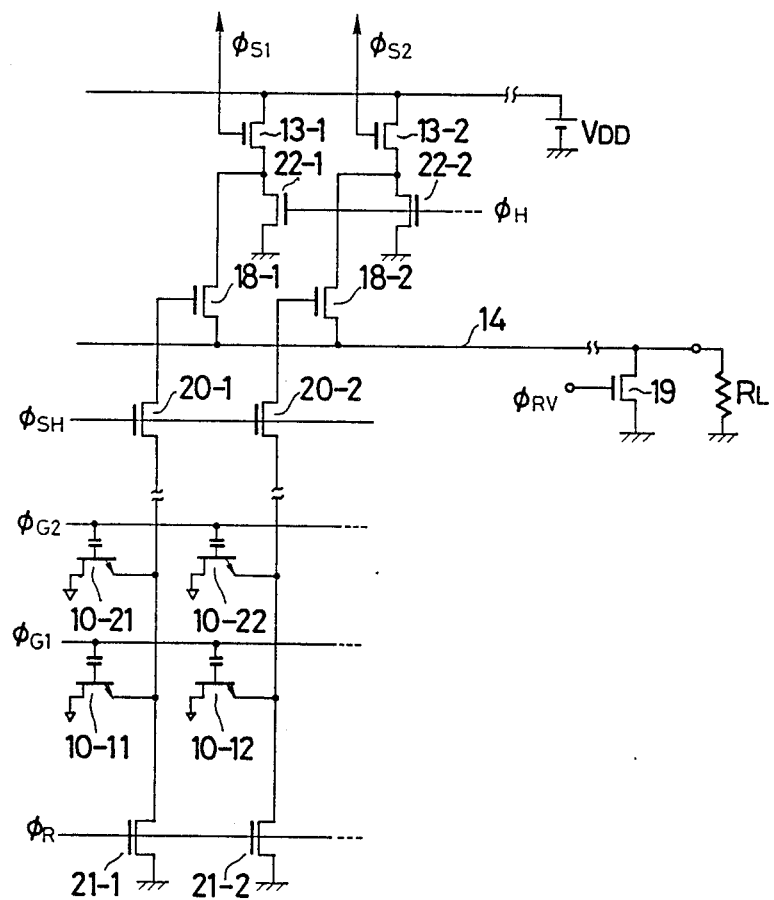
Figure 12C:
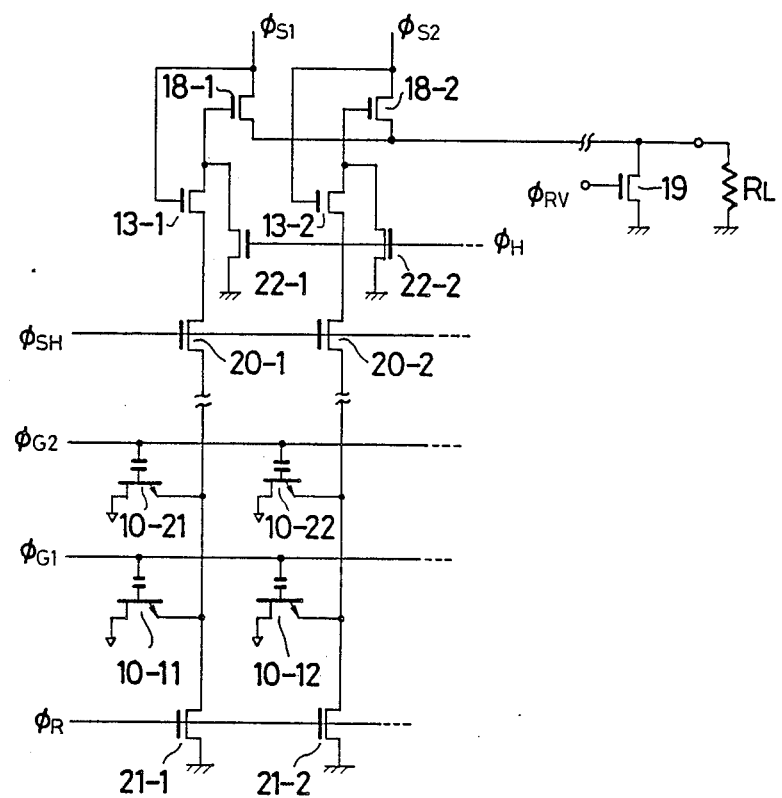

FIGS. 12A to 12C are circuit diagrams showing the essential parts of variations of the above embodiment. The components having the same functions as those shown in FIG. 11 are referred to by the same reference numerals.

In the variation shown in FIG. 12A, the drains of the drive MOSFETs 18-1, 18-2, . . . . . are not connected to the power source $V_{DD}$ but to the outputs $\phi_{S1}, \phi_{S2}, \ldots$ . . of the horizontal scanning circuit 15. This arrangement eliminates the need for the wiring of the power source $V_{DD}$.

In the variation shown in FIG. 12B, the connection of the power source $V_{DD}$ to the drains of the drive MOSFETTs 18-1, 18-2, . . . . . is turned on and off. The sources of the drive MOSFETs 18-1, 18-2, . . . . are commonly connected to the video line 14, MOSFETs 22-1, 22-2, . . . . . being connected to the nodes between the drains of these drive MOSFETs 18-1, 18-2, . . . . . and the horizontal connection switching MOSFETs so that these nodes may be reset. Supplied to the gates of the MOSFETs 22-1, 22-2, . . . . is a pulse $\phi_H$ having the same timing as the resetting pulse $\phi_{RV}$ which is to be applied to the gate of the resetting MOSFET 19 for resetting the video line 14, so as to turn on these resetting MOSFETs 22-1, 22-2, . . . . during the period in which the horizontal selection pulses $\phi_{S1}, \phi_{S2}$ . . . . are at the Low level.

In the variation shown in FIG. 12C, the connection between the sources of the sample MOSFETs 20-1, 20-2, . . . . . and the gates of the drive MOSFETs 18-1, 18-2, . . . . . is turned on and off by means of the horizontal selection switching MOSFETs 13-1, 13-2, . . . . . , the drains of the drive MOSFETs 18-1, 18-2, . . . . . and the gates of the switching MOSFETs 13-1, 13-2, . . . . . being connected to the outputs $\phi_{S1}, \phi_{S2}, \ldots$ of the horizontal scanning circuit 15. Connected to the nodes between the sources of the switching MOSFETs 13-1, 13-2, . . . . and the drive MOSFETs 18-1, 18-2, . . . . . are MOSFETs 22-1, 2222, . . . . so that these nodes may be reset. Supplied to the gates of these MOSFETs 22-1, 22-2, . . . . . is the pulse $\phi_H$ for turing on these MOSFETs 22-1, 22-2, . . . . during the period in which the horizontal selection pulses $\phi_{S1}, \phi_{S2}, \ldots$ are at the Low level, as in the case shown in FIG. 12B.

These variations yield the same effects as the embodiment shown in FIG. 10.

As described above, in accordance with this embodiment and the variations thereof, signals stored in the pixel SITs arranged in a matrix-like manner are simultaneously read out and held for each row line during a predetermined readout period and are successively read out during the horizontal scanning period. At the same time, the gate potential of any of all the pixel SITs whose gate potential is in excess of a predetermined potential which does not involve any blooming generation is clamped at said predetermined potential, resulting in an improvement in blooming resistance and a constantly high picture quality. Further, since the readout operation is performed by holding the pixel signals for each row line, a high output voltage can be obtained. In addition, the integration time is the same for all the pixels, with the integration point of time being the same for pixels belonging to the same row line, a feature constituting a focal plane shutter function. Furthermore, by partly modifying the drive pulse timing, non-destructive readout can be realized, which promises the possiblity of new applications of the device in such fields as image processing and instrumentation, which are not to be expected from the conventional image sensors using MOSs and CCDs.

While the solid-state imaging device described above with reference to a few embodiments thereof provides various advantages, it still involves a problem, which will be descussed below. It is to be supposed here that the pixel at the third row and the third column in an SIT image sensor (FIG. 10) having four rows and four columns is irradiated with intensive light, the saturated quantity of light being reached after the termination of the readut of the pixels in the first row.

Figure 13:
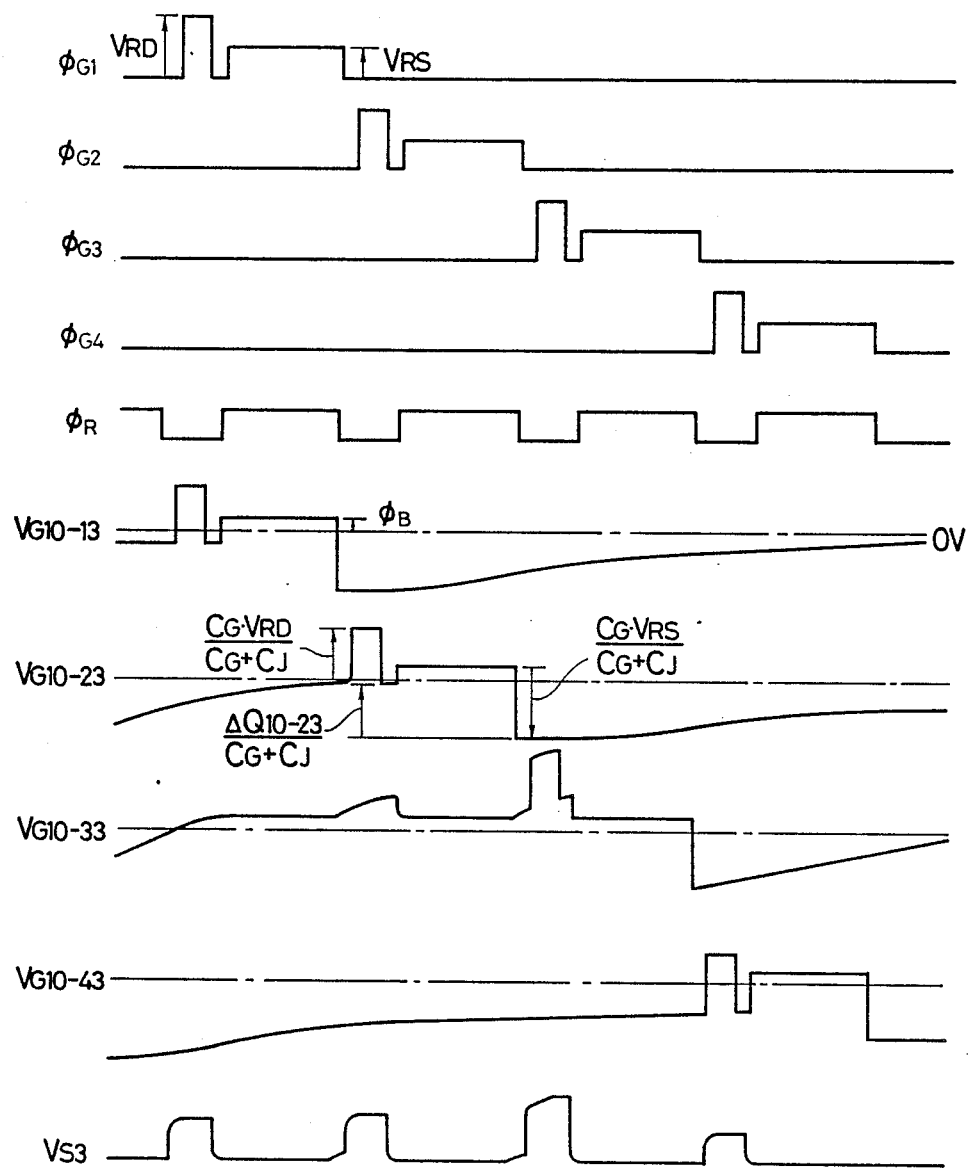
FIG. 13 is a signal waveform chart for illustrating the manner in which spurious signals are generated in the first embodiment shown in FIG. 10.
Figure 14:
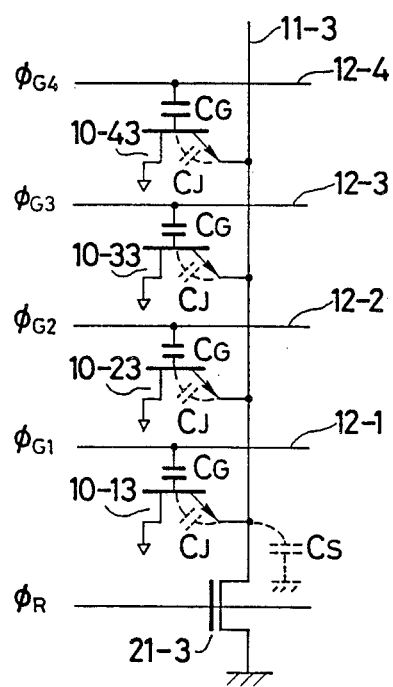
FIG. 14 is a partial structural drawing for illustrating the operation of the first embodiment shown in FIG. 10.

FIG. 13 shows the potentials of the vertical scanning pulses $\phi_{Gi}$, the vertical signal line resetting pulse 11-3 and the gate potentials of the pixel group connected thereto, and FIG. 14 shows part of the circuit diagram including the parasitic capacitance, focusing on the vertical signal line 11-3. In the drawing, the reference character $C_S$ denotes the parasitic capacitance in the vertical signal line, and it is to be supposed here that $C_S > C_J$ (the junction capacitance of the SITs).

Next, explanation will be given, with reference to FIGS. 13 and 14, of the potential $V_S$ of the vertical signal line 11-3 when the gate pulses $\phi_{Gi}$ are successively applied to the row lines 12-1, 12-2, ...... When in this case the reset pulse $\phi_R$ is at the Low level and the vertical signal line resetting MOSFET 21-3 is turned off, the vertical signal line 11-3 is put in a floating condition. When in this conditioin the row line 12-1 is selected and the vertical scanning pulse $\phi_{G1}$ has reached the lead level $V_{RD}$, the potential shown in the following equation (14) is applied to the gate of the pixel SIT 10-13:

$$\frac{C_G}{C_G + C_J \cdot C_S/(C_J + C_S)} \simeq \cdot V_{RD}$$

$$C_G/(C_G + C_J) \cdot V_{RD}$$

$$(C_S > C_J) \tag{14}$$

The gate potential $V_{G10\text{-}13}$ is given by the following equation (15):

$$V_{G10\text{-}13} = \phi_B + C_G/(C_G+C_J)\cdot(V_{RD}-V_{RS}) + \Delta Q_{10\text{-}13}/(C_G+C_J) \tag{15}$$

At this time, this pixel SIT 10-13 is turned on and $V_{GS} = V_P$, charging the source line parasitic capacitance $C_S$ until the the source/drain current $I_{DS}$ thereof is pinched off. The then source potential $V_{S11\text{-}3}$ is accordingly given by the following equation (16):

$$\begin{aligned} V_{S11-3} &= V_{G10-13} - V_P \\ &= \phi_B + C_G/(C_G+C_J)\cdot(V_{RD}-V_{RS}) + \\ &\quad \Delta Q_{10-13}/(C_G+C_J) - V_P \end{aligned} \tag{16}$$

When the vertical scanning pulse $\phi_{G1}$ has returned to the Low level and the vertical signal line resetting pulse $\phi_R$ is turned on, the source potential $V_S$ returns to the GND level. Suppose the incident quantity of light of the pixel SIT 10-33 has reached the saturation immediately after this. At this time, the gate potential $V_{G10\text{-}33}$ of the pixel SIT is clamped at the forward direction threshold voltage $\phi_B$ of the gate/source diode. Since $\phi_B$ is normally larger than $V_P$, this pixel SIT 10-33 is turned on, the source/drain current $I_{DS}$ beginning to flow to the GND through the vertical signal line resetting MOSFET 21-3.

When in this condition the vertical signal line resetting pulse $\phi_R$ is again lowered to the Low level and the resetting MOSFET 21-3 is turned off, the potential $V_S$ of the vertical signal line 11-3 immediately rises until $V_S = \phi_B - V_P$ (>0) in order to attain the condition in which $V_{GS} = \phi_B - V_S = V_P$. When, following this, light impinges upon the pixel SIT 10-33, the potential becomes such that $V_S = V_{PR} > \phi_B - V_P$ when $\phi_{G2}$ is at the lead level $V_{RD}$. The magnitude of the pulse applied then to the gate of the pixel SIT 10-23 is given by the following equation (17):

$$C_G/(C_G+C_J)\cdot(V_{RD}-V_{PR}) \tag{17}$$

Since the potential of the vertical signal line is $V_{PR}$, the then gate potential $V_{G10\text{-}23}$ is given by the following equation (18):

$$\begin{aligned} V_{G10-23} &= \phi_B + C_G/(C_G+C_J)\cdot(V_{RD}-V_{PR}-V_{RS}) + \\ &\quad \Delta Q_{10-23}/(C_G+C_J) + V_{PR} \\ &= \phi_B + C_G/(C_G+C_J)\cdot(V_{RD}-V_{RS}) + \\ &\quad \Delta Q_{10-23}/(C_G+C_J) + C_J/(C_G+C_J)\cdot V_{PR} \end{aligned} \tag{18}$$

This also applies to the case where the vertical scanning pulse $\phi_{G3}$ of the pixel SIT 10-33 reaches the lead level $V_{RD}$. However, when, following this, $\phi_{G4}$ of the pixel SIT 10-43 reaches $V_{RD}$, the pixel SIT 10-33 has only been reset before that, and there are no other pixels which are connected to the same vertical signal line whose $V_{GS}$ is in excess of $V_P$, so that the gate potential thereof is the same as that given by the equation (15).

As will be appreciated from the above equations (15) and (18), if there exists among the non-selected pixel group having a common vertical signal line a pixel which is ON with $V_{GS}$ being larger than $V_P$, as a result of intensive light impinging thereon, the gate potential becomes higher than when there exists no such pixel, even when a vertical scanning pulse at the same lead level is applied.

As described above, the gate potential faithfully reflects the source potential. Since in this imaging device a system is adopted in which the source potential when the readout level is applied to the pixels are read out through a horizontal readout circuit, the above-described difference in gate potentials will result, when the output signal of all the pixels are reproduced, in a blooming which is bright in the areas thereof extending longitudinally over the width (corresponding to the number of horizontal pixels which are irradiated with intensive light) if there is a subject exhibiting an intensive quantity of light which is or almost is saturated.

The embodiment shown below has been conceived in order to eliminate the above-mentioned problem in the embodiment described above. It is so constructed that such spurious signals as described above will not be generated even when the incident quantity of light is saturated or nearly saturated.

Figure 15:
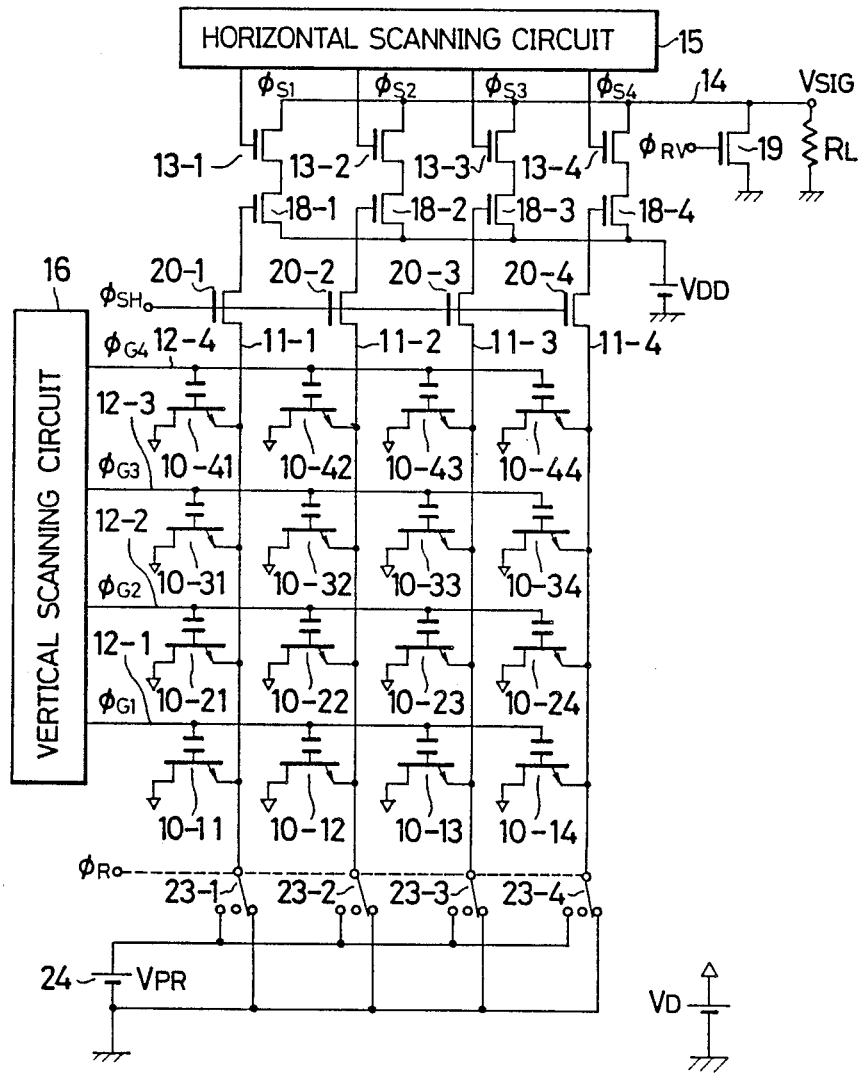
FIG. 15 is a circuit diagram showing the basic construction of the second embodiment of this invention.

FIG. 15 shows the basic construction of this second embodiment. In FIG. 15, the components which are identical with those in FIG. 10 are referred to by the same reference numerals. As shown in FIG. 15, this embodiment is so constructed that a voltage source 24 exhibiting a voltage $V_{PR}$ is connected to the vertical sigal lines 11-1, 11-2, ..... through respective switching elements 23-1, 23-2, .....

Before the gate pulses $\phi_{Gi}$ (i = 1, 2, . . . .) at the lead level $V_{RD}$ are applied to the gates of the pixels, these switching elements 23-1, 23-2, ..... charge the vertical signal line parasitic capacitance $C_S$ up to $V_{PR}$ by connecting the vertical signal lines 11-j (j = 1, 2, . . . .) to the above voltage source 24 (State 1). While the gate pulses $\phi_{Gi}$ at the lead level $V_{RD}$ are being applied, the above switching elements 23-1, 23-2, . . . . are connected to no level, putting the vertical signal line 11-j in a floating condition (State 2). Further, when the gate pulses $\phi_{Gi}$ at the resetting level $V_{RS}$ are being applied, these switching elements connect the vertical signal lines 11-j to the GND level (State 3).

With the above construction, the gate potential $V_G$ when the gate pulses $\phi_{Gi}$ at the readout level $V_{RD}$ are applied to the row lines 12-i (i =1, 2, . . . .) can be expressed by the following equation (19):

$$V_G = \phi_B + C_G/(C_G+C_J)\cdot(V_{RD}-V_{RS}) + \Delta Q/(C_G+C_J) + C_J/(C_G+C_J) \; V_{PR} \quad (19)$$

Accordingly, even when intensive light impinges upon a non-selected pixel and the $V_{GS}$ exceeds the $V_P$ and this pixel SIT is turned on, the other pixel signals connected to the same vertical signal line will not be read out as higher than they really are.

Figure 16:
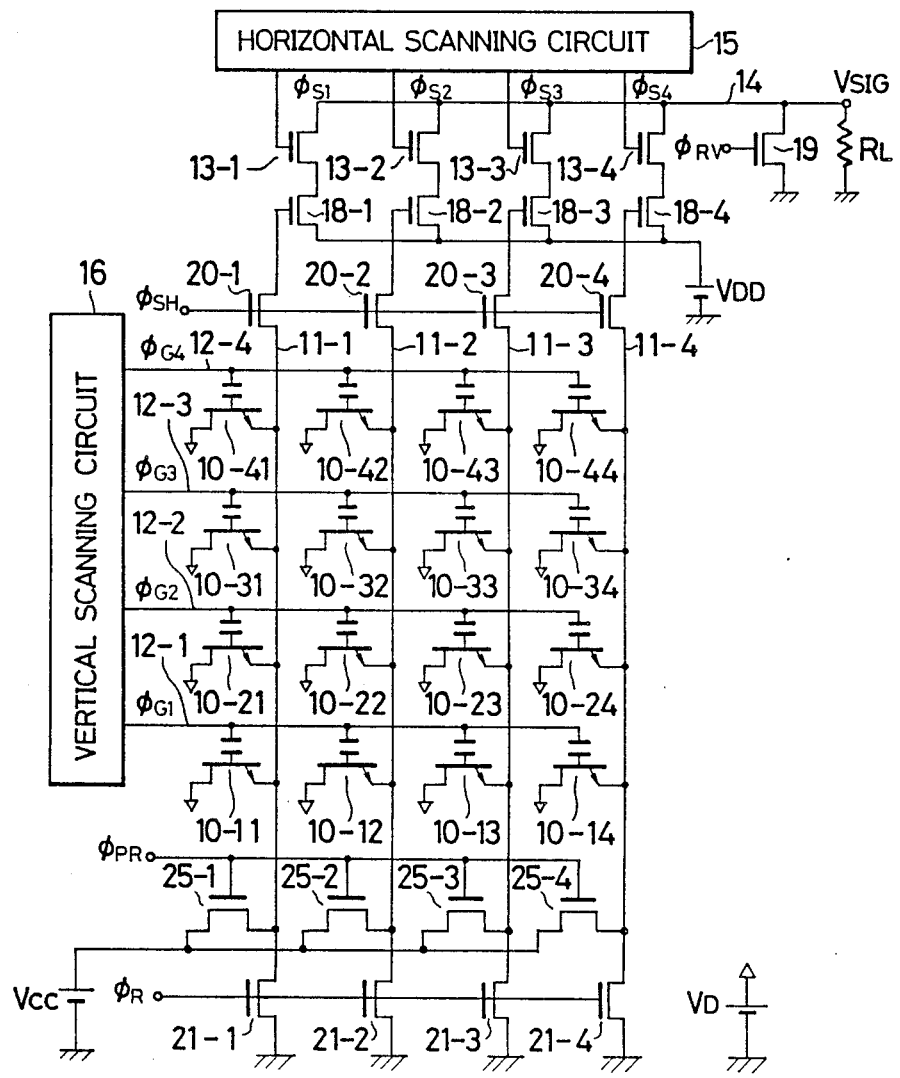
FIG. 16 is a circuit diagram concretely showing the construction of the second embodiment of this invention.

FIG. 16 is a circuit diagram showing a concrete construction examle of this second embodiment. In this example, the pixel SITs are shown, to simplify the explanation, as arranged in four rows and four columns in a matrix-like manner. The components which are identical with those shown in FIG. 10 are referred to by the same reference numerals, an explanation thereof being omitted. The end sections of the vertical signal lines 11-1, 11-2, . . . . 11-4 on the side opposed to the sample MOSFETs 20-1, 20-2, . . . . 20-4 are grounded, as in the first embodiment, through the vertical signal line resetting MOSFETs 21-1, 21-2, . . . . 21-4, the vertical signal line resetting pulse $\phi$ of the pixel SIT being commonly applied to the gates of these vertical signal line resetting MOSFETs. In this embodiment, these end sections are further connected to a power source $V_{CC}$ through vertical signal line precharging MOSFETs 25-1, 25-2, . . . . 25-4, a vertical signal line precharging pulse $\phi_{PR}$ being applied to the gates of these vertical signal line precharging MOSFETs. The High level $V_{PR}$ of this precharging pulse $\phi_{PR}$ is so set that $V_{PR}-V_T > V_{CC}$. The reference character $V_T$ here denotes the threshold voltage of the vertical signal line precharging MOSFETs.

Figure 17:
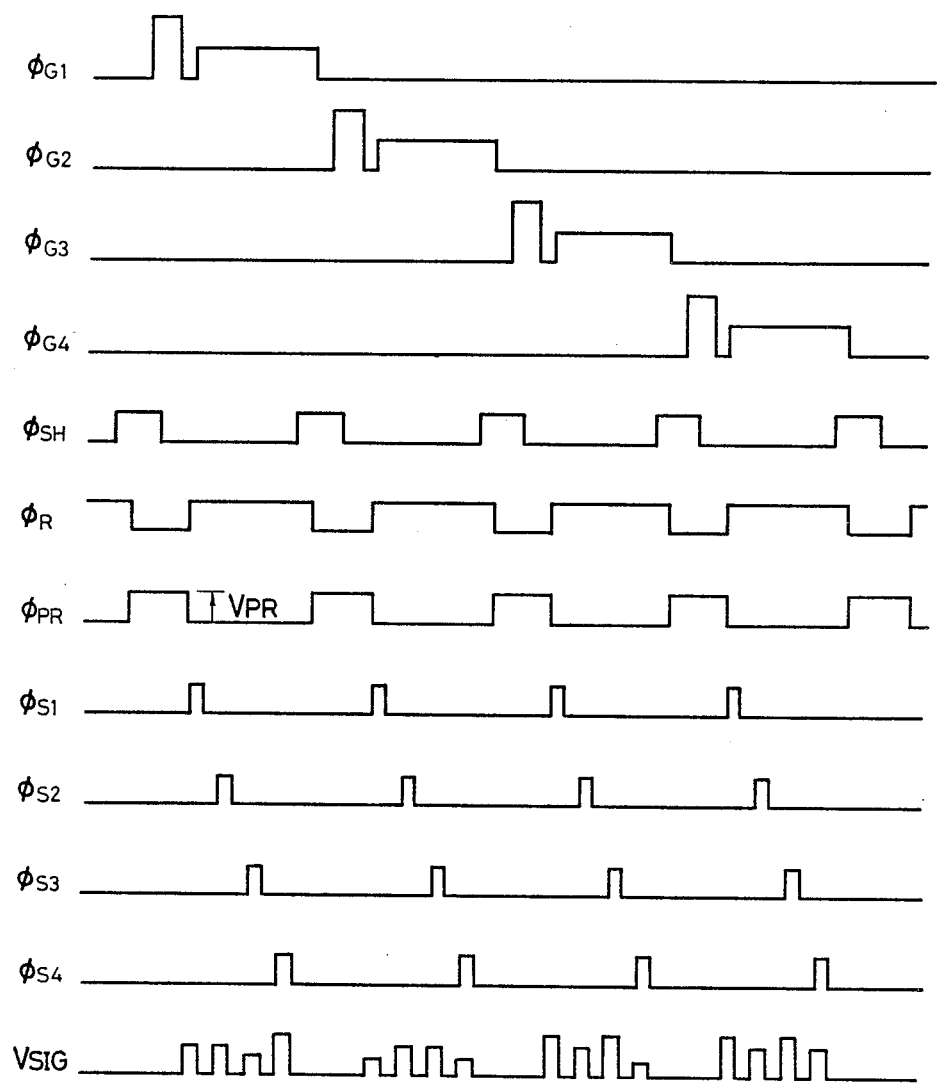
FIGS. 17 and 18 are signal waveform charts for illustrating the operation of the second embodiment.
Figure 18:
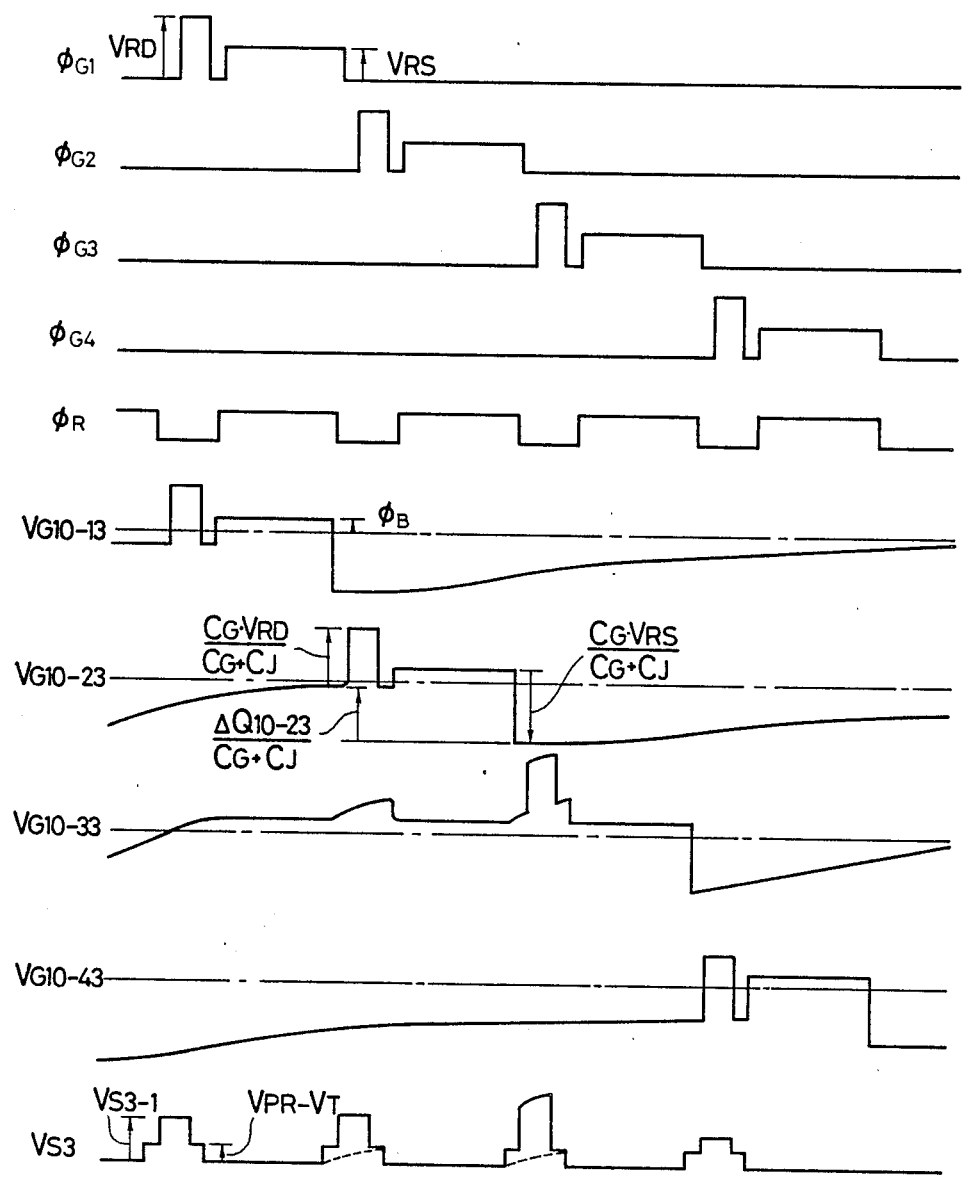

The operation of this embodiment will now be described with reference to FIGS. 17 and 18 which are timing charts of the drive pulse, the waveform of the output signal $V_{SIG}$, the gate potential and the source potential. As for the gate potential and the source potential, those of the SITs which are connected to the vertical signal line 11-3 are shown by way of example.

First, the vertical signal line resetting MOSFETs 21-1, 21-2, . . . 21-4 are turned on by the vertical signal line resetting pulse $\phi_R$, and when the vertical scanning pulse $\phi_{Gi}$ has reached the resetting level $V_{RS}$, the diode composed of the gates/sources of the SITs connected to the row line 12-i is biased in the forward direction, the gate potential becomimg the threshold voltage $\phi_B$ in the forward direction of this diode and the source potential reaching the GND level. When the vertical scanning pulse $\phi_{Gi}$ has been returned from the resetting level $V_{RS}$ to the GND level, the gate potential of the pixel SITs becomes $(\phi_B - C_G/(C_G+C_J)\cdot V_{RS})$, starting to accumulate optical charges.

After performing the integration for a predetermined period of time, the resetting pulse $\phi_R$ is lowered to the Low level, and the vertical signal line resetting MOSFET 21-j is turned off. When after that the vertical signal line precharging pulse $\phi_{PR}$ has reached the High level $V_{PR}$, the potential of the vertical signal line becomes approximately $(V_{PR}-V_T)$ since the vertical signal line precharging MOSFET 25-j is operating in the saturation range. At this time, the terminals connected to the power source $V_{CC}$ as seen from the terminals connected to the vertical signal line of the vertical signal line precharging MOSFETs 25-1, 25-2, . . . 25-4 exhibit a very high impedance.

When in this condition the vertical scanning pulse $\phi_{Gi}$ has reached the readout level $V_{RD}$, the gate potential $V_{Gij}$ of the pixel SITs are given by the following equation (20), as in the case of the above equation (18):

$$V_{Gij} = \phi_B + C_G/(C_G+C_J)\cdot(V_{RD}-V_{RS}) + \Delta Q_{ij}/(C_G+C_J) + C_J/(C_G+C_J)\cdot(V_{PR}-V_t) \quad (20)$$

where $\Delta Q_{ij}$ is the optical charge accumulated at the gates of the pixel SITs during the integration time. The pixel SITs, to the gates of which the readout level has been applied, charge the parasitic capacitance of the vertical signal line until $V_{GS}$ becomes equal to $V_P$.

As for the pinch-off voltage $V_P$, it is in the relation in which $V_P < \phi_B$, so that the diode between the gates and sources of the SITs does not exceed $\phi_B$. Accordingly, a potential $V_{Sij}$ which corresponds to the gate potential $V_{Gij}$ appears faithfully at the SIT sources, as shown in the following equation (21):

$$\begin{aligned}V_{Sij} &= V_{Gij} - V_P \quad (21)\\ &= \phi_B + C_G/(C_G+C_J)\cdot(V_{RD}-V_{RS}) + \\ &\quad \Delta Q_{ij}/(C_G+C_J) + C_J/(C_G+C_J)\cdot(V_{PR}-V_T) - V_P\end{aligned}$$

When in this condition the sample holding pulse $\phi_{SH}$ to be applied to the gates of the sample MOSFETs 20-1, 20-2, 20-4 is raised to the High level, the source potentials of the SITs in the i-th row line are simultaneously transmitted to the gates of the drive MOSFETs 18-1, 18-2, . . . . 18-4 through the sample MOSFETs 20-1, 20-2, . . . . 20-4, and are retained in the gate capacitance of the drive MOSFETs 18-1, 18-2, . . . . . 18-4 even after the sample holding pulse $\phi_{SH}$ has been lowered to the Low level.

After that, the vertical scanning pulse $\phi_{Gi}$ and the vertical signal line precharging pulse $\phi_{PR}$ are lowered to the Low level. The $\phi_{PR}$ can be lowered to the Low level at any time before the vertical scanning pulse $\phi_{Gi+1}$ of the next line reaches $V_{RD}$. While in this embodiment the vertical signal line precharging level is determined by operating the vertical signal line precharging MOSFET in the saturation range, the MOSFET may also be operated in the unsaturation range. In other words, the voltage values of the $V_{PR}$ and the $V_{CC}$ may be selected in such a manner that the relation $(V_{PR}-V_T > V_{CC})$ is established, the vertical signal line precharging pulse $\phi_{PR}$ falling before the vertical scanning pulse $\phi_{Gi}$ reaches the lead level $V_{RD}$. In this case, $(V_{PR}-V_T)$ in the equations (20) and (21) is replaced by $V_{CC}$.

Further, $\phi_{Gi}$ may be made equal to $V_{RD}$ after raising the sample holding pulse $\phi_{SH}$ to the High level. The vertical signal line resetting pulse $\phi_R$ is raised to the High level after lowering the sample holding pulse $\phi_{SH}$ to the Low level, and is lowered to the Low level immediately before the vertical scanning pulse $\phi_{Gi+1}$ of the next line reaches $V_{RD}$. As for $\phi_{Gi}$ (i =1, 2, . . . . 4), they are set to the resetting level $V_{RS}$ with the same timing as the resetting pulse $\phi_R$ or during the period in which the resetting pulse $\phi_R$ is at the High level.

The voltage signals $V'_{Sij}(=V_{Sij})$ held in the gate capacity of the drive MOSFETs 18-i are successively read out by turning on the switching MOSFETs 13-j with the horizontal scanning pulses $\phi_{Sj}$ (j = 1, 2, .... 4) during the period in which the sample holding pulse $\phi_{SH}$ is at the Low level. Suppose here that the voltage gain of the source follower composed of the drive MOSFETs 18-j, switching MOSFETs 13-j and the load resistor $R_L$ is a, the output $V_{SIGij}$ can be expressed by the following equation (22):

$$V_{SIGij} = a \cdot V_{Sij} \quad (22)$$
$$= a\{\phi_B + C_G/(C_G + C_J) \cdot (V_{RD} - V_{RS}) + \Delta Q_{ij}/(C_G + C_J) + C_J/(C_G + C_J) \cdot (V_{PR} - V_T) - V_P\}$$

The above operation is performed successively for the row lines 12-1, 12-2, .... 12-4 by means of the vertical scanning circuit 16 to obtain the output signal for one frame. Thus, before the vertical scanning pulses $\phi_{Gi}$ have reached $V_{RD}$, a condition is attained which is equivalent to that where the vertical signal line is connected to a high-impedance voltage source ($V_{PR} - V_T$). As a result of this arrangement, the potential when the row line readout level is applied follows the equation (21) even when non-selected pixel SIT is turned on due to intensive incident quantity of light as long as the potential which it generates (the potential represented by the broken lines of $V_{S3}$ in FIG. 18) does not exceed ($V_{PR} - V_T$), so that pixel signals which are faithful to the incident quantity of light can be constantly obtained.

When it is so arranged by adjusting $V_{RD}$ and $V_{RS}$ that when the quantity of light is 0, the source potential is equal to or higher than the High level $V_{PR}$ of the precharging pulse, the output signals will not be buried under this $V_{PR}$ even when the illuminance is low. Further, this arrangement helps to improve the blooming resistance. For, even when intensive quantity of light which is in excess of the saturated quantity of light impinges upon a non-selected pixel, the source potential generated by the pixel, for example, the potential indicated by the broken lines at $V_{S3}$ in FIG. 18 is not detected by the horizontal readout circuit until it exceeds $V_{PR}$.

Figure 19:
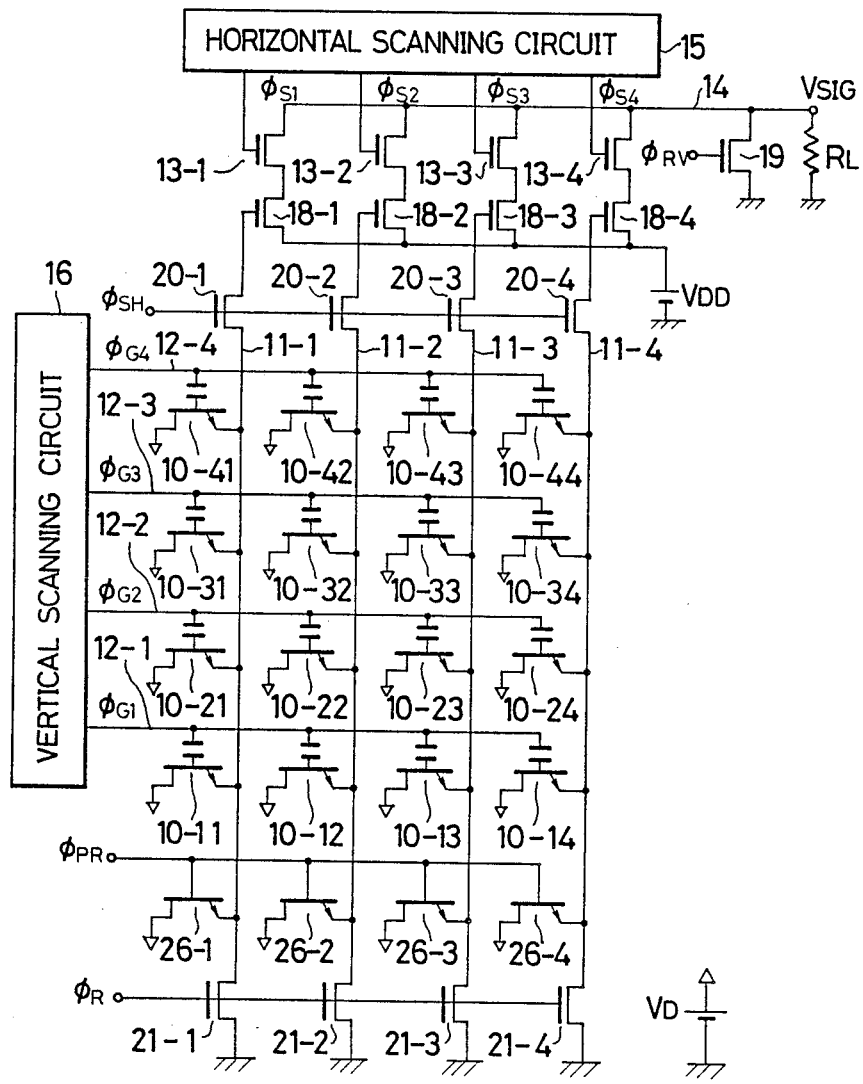
FIGS. 19, 20 and 21 are circuit diagrams showing variations of the second embodiment.

FIG. 19 is a circuit diagram showing a variation of the second embodiment. While in the second embodiment shown in FIG. 16 MOSFETs are utilized for the purpose of precharging the vertical signal line, this variation employs SITs 26-1, 26-2, ... 26-4, instead of MOSFETs. The operation of this variation is the same as that of the embodiment shown in FIG. 16, except for the fact that when $\phi_{PR}$ has reached the High level, the potential which appears in the vertical signal line is ($V_{PR} - V_P$).

Figure 20:
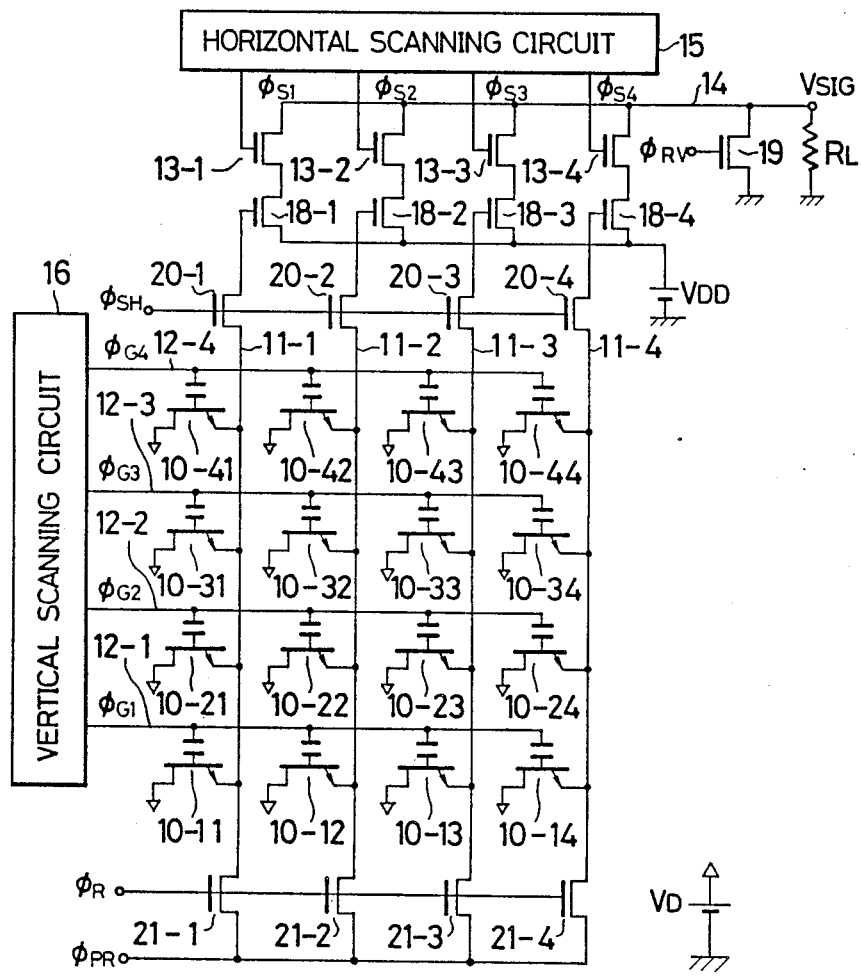

FIG. 20 is a circuit diagram showing another variation of the second embodiment. In this variation, the vertical signal line resetting MOSEFETs 21-1, 21-2, .... 21-4 also have a precharging function. The timing of the vertical signal line precharging pulse $\phi_{PR}$ and that of the vertical signal line resetting pulse $\phi_R$ are the same as those in the second embodiment. Only, the High level of $\phi_{PR}$ corresponds to $V_{CC}$ in the second embodiment and the Low level of the resetting pulse $\phi_R$ to $V_{PR}$.

When the resetting pulse $\phi_R$ has reached the High level, and the vertical signal line resetting MOSFETs 21-1, 21-2, .... 21-4 perform the operation of resetting the vertical signal line, the $\phi_{PR}$ reaches the GND level, the same resetting operations of the pixel SITs and the vertical signal line as before being performed. When the resetting pulse $\phi_R$ has reached the Low level $V_{PR}$ (>GND level), $\phi_{PR}$ reaches the $V_{CC}$ level, and, as in the second embodiment, the vertical signal line resetting MOSFETs operate in the saturation range, charging the vertical signal line to ($V_{PR} - V_T$). The operations following this are the same as in the second embodiment. Thus, this embodiment is advantageous in that it needs no precharging elements.

Figure 21:
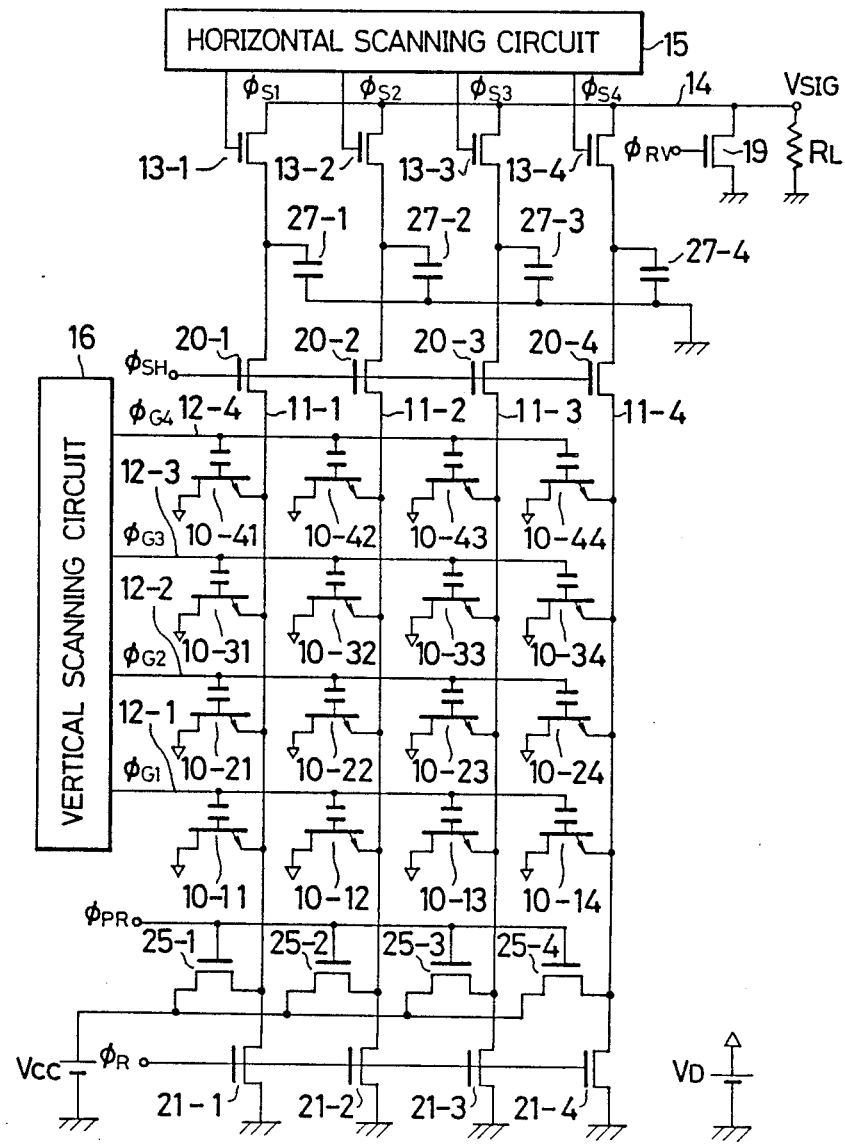

FIG. 21 is a circuit diagram showing still another variation of the second embodiment. In this variation, the signal voltages read out of the vertical signal lines 11-2, 11-2, .... 11-4 are retained in holding capacitors 27-1, 27-2, .... 27-4 (capacitance value $=C_H$) provided between the drain terminals of the sample MOSFETs 20-1, 20-2, ... 20-4 and the GND terminals. The following readout operation is performed by discharging onto the video line 14 the signal charge ($C_H \times v_S$) stored in the holding capacitors 27-1, 27-2, .... 27-4 in the form of the signal voltage $v_S$, with the switch ON timing of the horizontal selection switches 13-1. 13-2, .... 13-4, the readout result appearing as $V_{SIG}$ at the output terminal.

The difference between this variation and the embodiment shown in FIG. 16 lies in the fact that the capacitors retaining the signal voltages of the vertical signal line do not constitute the gate terminal parasitic capacitance but newly provided capacitors, there being no difference in the operation through which the signal voltages are retained in the capacitors. This variation accordingly has, as does the second embodiment, the effect of burying spurious signals appearing in the vertical signal line in the vertical signal line precharging voltage due to the forced charge injection from the precharging MOSFETs. Only, since the precharging charge portion for restraining spurious signals is superimposed on the signal charge retained in the hold capacitors, it is detected as an off-set signal charge which does not depend on the signals, at the output end at the time of reading out the signal charge onto the video line. It consequently requires the operation of subtracting the precharging charge portion from the signals by the following circuit processings.

As described above in detail, the second embodiment and the variations thereof, are so arranged &hat the control electrode potential when the selection pulse is applied to the control electrode of the a photoelectric transfer element is always a predetermined value in accordance with the incident quantity of light. Even when intensive light impinges upon a non-selected pixel, causing it to be turned on, the signals of the other pixels connected to the same signal selection line will not be read out as larger than they really are.

The second embodiment and the variations thereof, accordingly help to prevent still more effectively the phenomenon of blooming which would in conventional devices cause the upper and lower sections of a high-luminance subject to appear brighter in the picture reproduced.

What is claimed is:

1. A solid-state imaging device comprising:
   a plurality of static induction transistors arranged in a matrix-like manner between a plurality of row lines and a plurality of vertical signal lines, each of which is connected to a row line with the gate electrode thereof and to a vertical signal line with one principal electrode thereof;

drive transistors connected to each of said plurality of vertical signal lines through respective sample transistors;

drive means for simultaneously reading out during a predetermined readout period the signals stored in said static induction transistors, in accordance with row selection signals to be applied to said row lines, holding said signals in the gates of said drive transistors through the drain-source paths of said sample transistors, and successively reading out within the horizontal scanning period the signals thus held; and spurious signal generation preventing means for preventing generation of spurious signals due to the ON-operation of the static induction transistors connected to those row lines to which said row selection signal is not applied.

2. A solid-state imaging device as claimed in claim 1, wherein said spurious signal generation preventing means consist of clamping means for clamping the gate potentials of all the static induction transistors at a predetermined potential during the periods excluding said predetermined readout period.

3. A solid-state imaging device as claimed in claim 2, wherein said clamping means consist of resetting MOS transistors, each of said MOS transistor being connected at one main electrode thereof to a vertical signal line, and grounded at the other main electrode, with the gate being impressed with a vertical signal line resetting pulse.

4. A solid-state imaging device as claimed in claim 2, wherein said predetermined readout period is set shorter than the period for the clamping effected by said clamping means.

5. A solid-state imaging device as claimed in claim 2, wherein said predetermined readout period and the point of time at which the signals read out during the period are held by said drive transistors are set within the horizontal blanking period, the period for the clamping effected by said clamping means being set within said horizontal scanning period.

6. A solid-state imaging device as claimed in claim 4, wherein said predetermined readout period and the point of time at which the signals read out during the period are held by said drive transistors are set within the horizontal blanking period, the period for the clamping effected by said clamping means being set within said horizontal scanning period.

7. A solid-state imaging device as claimed in claim 1, wherein said spurious signal generation preventing means consist of charging means for charging the parasitic capacitance connected to said vertical signal lines up to a predetermined level before applying said selection signal.

8. A solid-state imaging device as claimed in claim 7, wherein said charging means consist of MOS transistors, each of said MOS transistors being connected at one end to a power source with a predetermined voltage and at the other end to one of said vertical signal lines.

9. A solid-state imaging device as claimed in claim 7, wherein said charging means consist of static induction transistors, each of said static induction transistors being connected at one end to a power source with a predetermined voltage and at the other end to one of said vertical signal lines.

10. A solid-state imaging device as claimed in claim 7, wherein said charging means consist of resetting MOS transistors each of which is connected to a vertical signal line at one main electrode thereof and impressed with a precharging pulse at the other main electrode, with the gate being impressed with a vertical signal line resetting pulse.

11. A solid-state imaging device comprising:

a plurality of static induction transistors arranged in a matrix-like manner between a plurality of row lines and a plurality of vertical signal lines, each of which is connected to a row line with the gate electrode thereof and to a vertical signal line with one principal electrode thereof;

capacitors connected to each of said plurality of vertical signal lines through respective sample transistors;

drive means for simultaneously reading out during a predetermined readout period the signals stored in said static induction transistors, in accordance with row selection signals to be applied to said row lines, holding said signals in said capacitors, said signals input to said capacitors through said sample transistors, and successively reading out within the horizontal scanning period the signals thus held; and spurious signal generation preventing means for preventing generation of spurious signals due to the ON-operation of the static induction transistors connected to those row lines to which said row selection signal is not applied, wherein said spurious signal generation means includes charging means for the parasitic capacitance connected to said vertical signal lines up to a predetermined level before applying said selection signal and wherein said charging means includes MOS transistors, each of said MOS transistors being connected at one end to a power source with a predetermined voltage and at the other end to one said vertical signal lines.

* * * * *